US010667256B2

(12) United States Patent
Lake et al.

(10) Patent No.: US 10,667,256 B2
(45) Date of Patent: May 26, 2020

(54) SYSTEM AND METHOD TO PROVIDE DYNAMIC BANDWIDTH ALLOCATION OVER WIDE AREA NETWORKS

(71) Applicant: CISCO TECHNOLOGY, INC., San Jose, CA (US)

(72) Inventors: David Lake, Crawley (GB); Mark Grayson, Maidenhead (GB); Santosh Ramrao Patil, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 164 days.

(21) Appl. No.: 14/939,884

(22) Filed: Nov. 12, 2015

(65) Prior Publication Data
US 2017/0142709 A1    May 18, 2017

(51) Int. Cl.
*H04W 72/04* (2009.01)
*H04L 29/08* (2006.01)
*H04W 24/08* (2009.01)

(52) U.S. Cl.
CPC ....... *H04W 72/0446* (2013.01); *H04L 67/142* (2013.01); *H04W 24/08* (2013.01); *H04W 72/04* (2013.01)

(58) Field of Classification Search
CPC ............. H04W 24/02; H04W 28/0247; H04W 28/0289; H04W 24/00; H04W 28/021; H04W 28/0215; H04W 28/0221; H04W 28/0257; H04W 28/0284; H04W 28/12; H04W 28/20; H04W 36/14; H04W 48/04;
(Continued)

(56) References Cited

U.S. PATENT DOCUMENTS 8,064,909 B2   11/2011  Spinelli et al.
8,400,921 B2    3/2013  Grayson et al.
(Continued)

OTHER PUBLICATIONS

"3GPP TS 23.060 V13.3.0 (Jun. 2015) Technical Specification: 3rd Generation Partnership Project; Technical Specification Group Services and System Aspects; General Packet Radio Service (GPRS); Service description; Stage 2 (Release 13)," 3GPP, 650 Route des Lucioles—Sophia Antipolis, Valbonne—France, Jun. 2015; 358 pages.
(Continued)

*Primary Examiner* — Jeffrey M Rutkowski
*Assistant Examiner* — Chae S Lee
(74) *Attorney, Agent, or Firm* — Patterson + Sheridan, LLP

(57) ABSTRACT

An example method is provided in one example embodiment and includes intercepting a setup request for a session via a small cell network portion associated with a wide area network (WAN) instance, wherein the WAN instance comprises the small cell network portion and an enterprise network portion and wherein the small cell network portion and the enterprise network portion are interconnected to a service provider network; classifying the session to a particular WAN priority queue, wherein a plurality of WAN priority queues are configured for the WAN instance; determining whether the particular WAN priority queue has available bandwidth for the session; allocating bandwidth for the particular WAN priority queue if the particular WAN priority queue has available bandwidth; and permitting the session to be established if the particular WAN priority queue has available bandwidth.

22 Claims, 13 Drawing Sheets

(58) Field of Classification Search
CPC . H04W 48/06; H04W 72/0446; H04W 24/08; H04L 67/142
See application file for complete search history.

(56) References Cited

U.S. PATENT DOCUMENTS

| | | | | |
|---|---|---|---|---|
| 8,588,793 | B2* | 11/2013 | Tomici | H04W 76/025 370/331 |
| 2004/0078460 | A1 | 4/2004 | Valavi et al. | |
| 2004/0153545 | A1* | 8/2004 | Pandya | H04L 29/06 709/226 |
| 2010/0214977 | A1* | 8/2010 | Hegde | H04W 28/18 370/328 |
| 2011/0228673 | A1* | 9/2011 | Grayson | H04L 47/10 370/232 |
| 2011/0228750 | A1 | 9/2011 | Laha et al. | |
| 2012/0044955 | A1* | 2/2012 | Chandrasekaran | H04L 41/0896 370/468 |
| 2014/0287760 | A1* | 9/2014 | Spinelli | H04W 92/02 455/437 |
| 2014/0341109 | A1* | 11/2014 | Cartmell | H04L 45/308 370/328 |
| 2015/0173011 | A1* | 6/2015 | Das | H04W 16/26 370/328 |
| 2016/0113025 | A1* | 4/2016 | Shaw | H04W 72/10 455/450 |
| 2017/0317937 | A1* | 11/2017 | Dillon | H04L 47/22 |

OTHER PUBLICATIONS

"3GPP TS 23.203 V13.5.1 (Sep. 2015) Technical Specification: 3rd Generation Partnership Project; Technical Specification Group Services and System Aspects; Policy and charging control architecture (Release 13)," 3GPP 650 Route des Lucioles—Sophia Antipolis, Valbonne—France, Sep. 2015; 243 pages.
"3GPP TS 23.207 V9.0.0 (Dec. 2009) Technical Specification: $3^{rd}$ Generation Partnership Project; Technical Specification Group Services and System Aspects; End-to-end quality of Service (QoS) concept and architecture (Release 9);" 3GPP 650 Route des Lucioles—Sophia Antipolis, Valbonne —France, Dec. 2009; 39 pages.
"3GPP TS 36.413 V13.0.0 (Jun. 2015) Technical Specification: 3rd Generation Partnership Project; Technical Specification Group Radio Access Network; Evolved Universal Terrestrial Radio Access Network (E-UTRAN); S1 Application Protocol (S1AP) (Release 13)," 3GPP 650 Route des Lucioles—Sophia Antipolis, Valbonne—France, Jun. 2015; 302 pages.
3GPP TSG-GERAN Ad Hoc Meeting#2, GAHW#2 (00)0066, "GERAN A, Enhanced-A, and Iu-cs Interfaces," BellSouth, SBC, Oct. 9-13, 2000, Munich, Germany; 8 pages.
"ETSI TS 125 331 V12.7.0 (Oct. 2015) Technical Specification: Universal Mobile Telecommunications System (UMTS); Radio432 pages Resource Control (RRC); Protocol Specification; (3GPP TS 25.331 version 12.7.0 Release 12)," ETSI, 650 Route des Lucioles—Sophia Antipolis, Valbonne—France; Oct. 2015; 2287 pages.
"ETSI TS 125 413 V12.4.0 (Apr. 2015) Technical Specification: Universal Mobile Telecommunications System (UMTS); UTRAN Iu interface Radio Access Network Application Part (RANAP) signaling (3GPP TS 25.413 version 12.4.0 Release 12)," ETSI, 650 Route des Lucioles—Sophia Antipolis, Valbonne—France; Apr. 2015; 432 pages.
"ETSI TS 125 467 V12.3.0 (Jan. 2015) Technical Specification: Universal Mobile Telecommunications System (UMTS); UTRAN Architecture for 3G Home Node B (HNB); Stage 2 (3GPP TS 25.467 Version 12.3.0 Release 12)," ETSI, 650 Route des Lucioles—Sophia Antipolis, Valbonne—France; Jan. 2015; 93 pages.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12)," ETSI, 650 Route des Lucioles—Sophia Antipolis, Valbonne—France; Feb. 2015; 227 pages.
"ETSI TS 136 331 V8.21.0 (Jul. 2014) Technical Specification: LTE; Evolved Universal Terrestrial Radio Access (E-UTRA); Radio Resource Control (RRC); Protocol specification (3GPP TS 36.331 Version 8.21.0 Release 8)," ETSI, 650 Route des Lucioles—Sophia Antipolis, Valbonne—France; Jul. 2014; 222 pages.
"ETSI TS 136 401 V12.2.0 (Apr. 2015) Technical Specification: LTE; Evolved Universal Terrestrial Radio Access Network (E-UTRAN); Architecture description; (3GPP TS 36.401 version 12.2.0 Release 12)," ETSI, 650 Route des Lucioles—Sophia Antipolis, Valbonne—France; Apr. 2015; 23 pages.
"ETSI TS 125 469 V12.4.0 (Apr. 2015) Technical Specification: Universal Mobile Telecommunications System (UMTS); UTRAN Luh Interface Home Node B (HNB) Application Part (HNBAP) signaling (3GPP TS 25.469 version 12.4.0 Release 12)," ETSI, 650 Route des Lucioles—Sophia Antipolis, Valbonne—France; Apr. 2015; 123 pages.
"ETSI TS 136 211 V12.5.0 (Apr. 2015) Technical Specification: LTE; Evolved Universal Terrestrial Radio Access (E-UTRA); Physical channels and modulation (3GPP 36.211 version 12.5.0 Release 12)," ETSI, 650 Route des Lucioles—Sophia Antipolis, Valbonne—France; Apr. 2015; 139 pages.
EPO Mar. 23, 2017 Search Report and Opinion from European Application Serial No. 16197841.6; 8 pages.
Kassler, A., et al., "Multimedia communication in policy based heterogeneous wireless networks," Proceedings of 2004 IEEE $59^{th}$ Vehicular Technology Conference, Milan, Italy, May 2004, DOI: 10.1109/VETECS.2004.1391472; ISBN: 978-0-7803-8255-8.
"Broadband Forum Technical Report, TR-069, CPE WAN Management Protocol," The Broadband Forum, Issue: 1 Amendment 5, Issue Date: Nov. 2013, CWMP Version: 1.4; 228 pages.
"Broadband Forum Technical Report, TR-196, Femto Access Point Service Data Model," The Broadband Forum, Issue: 2, Issue Date: Nov. 2011; 46 pages.
"Busy Hour Call Attempts," Wikipedia, the free encyclopedia, Aug. 16, 2013; 2 pages.
"Differentiated Services," Wikipedia, the free encyclopedia, Jun. 25, 2015; 7 pages.
"Erlang (unit)," Wikipedia, the free encyclopedia, Oct. 13, 2015; 8 pages.
Bernet, Y., et al., "Format of the RSVP DCLASS Object," Network Working Group RFC 2996, Nov. 2000; 9 pages.
Braden, R., et al., "Resource Reservation Protocol (RSVP)—Version 1 Functional Specification," Network Working Group RFC 2205, Sep. 1997; 112 pages.
Cisco Systems, Inc., "Chapter 1: Quality of Service Design Overview," *Enterprise QoS Solution Reference Network Design Guide*, Version 3.3, First published on or about Apr. 11, 2014, 34 pages.
Cisco Systems, Inc., "Chapter 3: WAN Aggregator QoS Design," *Enterprise QoS Solution Reference Network Design Guide*, Version 3.3, First published on or about Apr. 11, 2014; 50 pages.
Cisco Systems, Inc., "Chapter 6: DSCP and Precedence Values," *Cisco Nexus 1000V Quality of Service Configuration Guide*, Release 4.0(4)SV1(1); Nov. 25, 2009; 2 pages.
Cisco Systems, Inc., "Cisco Unified Communications Manager 10.5 Data Sheet," First published on or about Jun. 2014; 4 pages.
Cisco Systems, Inc., "Cisco Universal Small Cell Solution: A Platform for Service Innovation," First published on or about Sep. 25, 2015; 12 pages.
Cisco Systems, Inc., "Enhanced Location Call Admission Control," *Cisco Unified Communications Manager Features and Services Guide*, Release 9.0(1), First published on or about Jun. 20, 2014; 10 pages.
Cisco Systems, Inc., "HNB-GW Administration Guide, StarOS Release 16," Mar. 27, 2015; 153 pages.
Cisco Systems, Inc., "Implementing Quality of Service Policies with DSCP," Document ID 10103, Feb. 16, 2008; 7 pages.
Cisco Systems, Inc., "Small Business PBX: The Basics," First published on or about Feb. 1, 2009; 2 pages.

(56) References Cited

OTHER PUBLICATIONS

Jones, Tim, Meet the Extensible Message and Presence Protocol (XMPP), IBM Developer Works, Sep. 15, 2009; 11 pages.

* cited by examiner

SYSTEM AND METHOD TO PROVIDE DYNAMIC BANDWIDTH ALLOCATION OVER WIDE AREA NETWORKS

TECHNICAL FIELD

This disclosure relates in general to the field of communications and, more particularly, to a system and method to provide dynamic bandwidth allocation over wide area networks.

BACKGROUND

Networking architectures have grown increasingly complex in communication environments. For example, small cell radio access points have gained notoriety due to their capabilities to connect wireless devices to a network. In general terms, small cell radio access points can operate in a licensed spectrum to connect user equipment to the network, often using broadband connections. For a mobile operator, small cell radio access points can offer improvements to both coverage and capacity, which is particularly applicable to indoor networking environments where macro cell networks typically suffer coverage limitations. Small cell radio access points can also offer an alternative networking architecture to deliver the benefits of scalable small cell deployments. In a wide area network (WAN), such as an enterprise deployment, bandwidth for the WAN is often shared among traffic traversing the WAN for enterprise communication devices that are part of an enterprise network and small cell radio access points that are part of a small cell network. In some cases, bandwidth for the WAN can be overloaded, which can cause degradation to all traffic traversing the WAN. Accordingly, there are significant challenges in managing bandwidth allocation for wide area networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
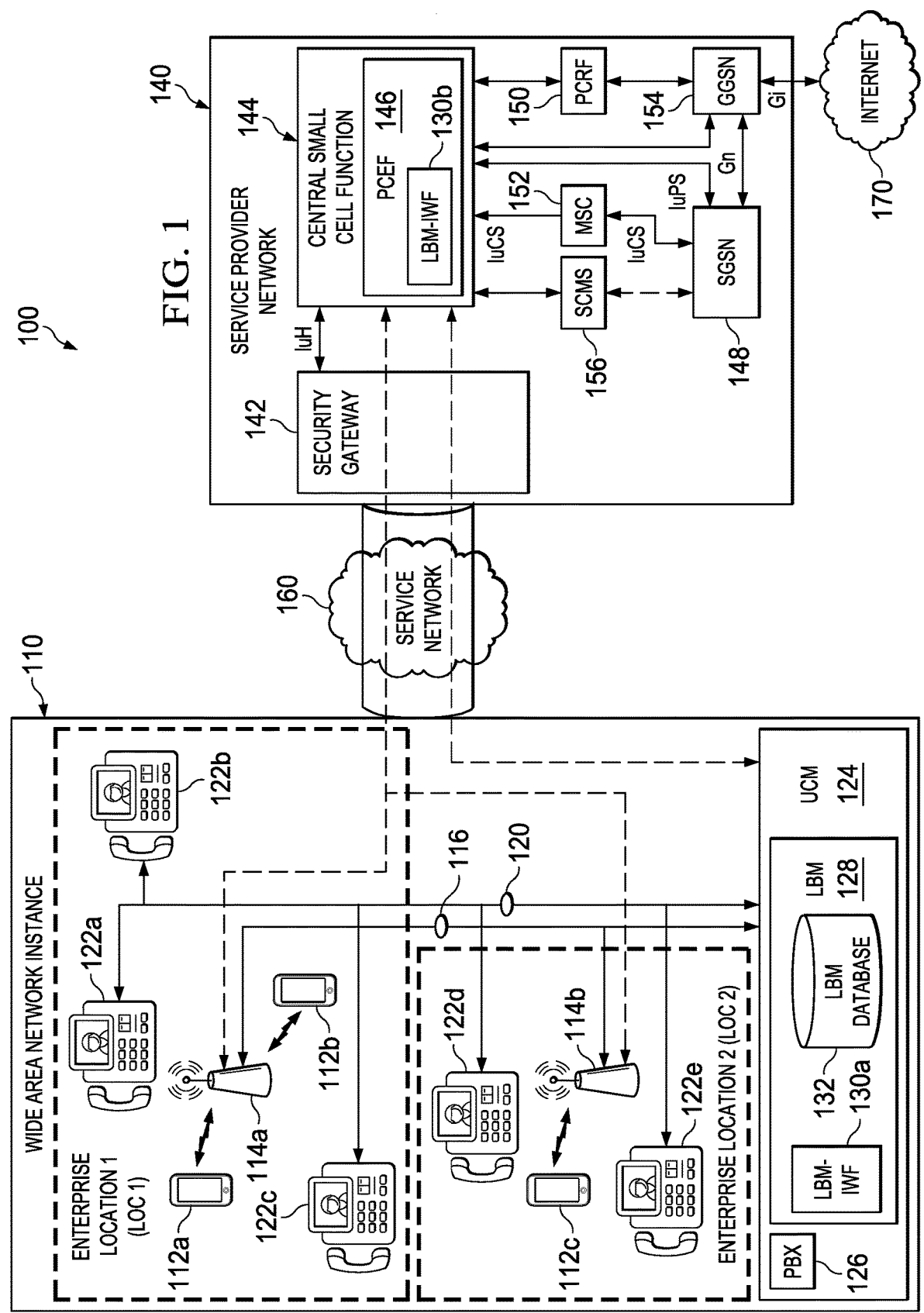
FIG. 1 is a simplified block diagram illustrating a communication system to facilitate providing dynamic bandwidth allocation over a wide area network (WAN) instance according to one embodiment of the present disclosure.

A method for a communication network is provided in one example embodiment and may include intercepting a setup request for a session via a small cell network portion associated with a wide area network (WAN) instance, wherein the WAN instance comprises the small cell network portion including one or more small cell radios and a central small cell function and an enterprise network portion including one or more enterprise communication devices and wherein the small cell network portion and the enterprise network portion of the WAN instance are interconnected with each other and to a service provider network; classifying the session to a particular WAN priority queue, wherein a plurality of WAN priority queues are configured for the WAN instance; determining whether the particular WAN priority queue has available bandwidth for the session; allocating bandwidth for the particular WAN priority queue if the particular WAN priority queue has available bandwidth; and permitting the session to be established if the particular WAN priority queue has available bandwidth.

In at least one case, determining whether the particular WAN priority queue has available bandwidth for session can include determining a bandwidth requirement for the session based on a session type associated with the session; calculating an instantaneous aggregated load for the particular WAN priority queue via one or more signaling exchanges with the one or more small cell radios within the small cell network portion of the WAN instance; and calculating an instantaneous aggregate available bandwidth for the particular WAN priority queue via one or more signaling exchanges with a location bandwidth manager within the enterprise network portion of the WAN instance.

In at least one case, it can be determined that the particular WAN priority queue has available bandwidth for the session if the instantaneous aggregate available bandwidth for the WAN priority queue is greater than or equal to the bandwidth requirement for the session. Calculating the instantaneous aggregated load for the particular WAN priority queue can include calculating a sum of bandwidth previously allocated for one or more other sessions previously established or for one or more other sessions seeking being established for the particular WAN priority queue. Calculating the instantaneous aggregate available bandwidth can include subtracting the instantaneous aggregate load for the particular WAN priority queue from a total bandwidth reserved for the particular WAN priority queue for the WAN instance.

In some cases, multiple WAN instances can be configured for the communication system. If the communication network comprises a plurality of WAN instances, the method can further include classifying the setup request to a particular WAN instance based on a location of a small cell radio associated with the setup request.

In at least one case, if bandwidth for the particular WAN priority queue is not available for the session, the method can further include one of: denying the session from being established; permitting the session to be established if a Best Effort queue has available bandwidth; re-routing the session to another WAN instance if a plurality of WAN instances are configured for the communication network and another WAN instance has available bandwidth; and holding the setup request for a period of time before repeating the determining whether bandwidth for the particular WAN priority queue is available for the session.

In at least one case, if bandwidth for the particular WAN priority queue is not available for the session, the method can further include at least one of: managing Quality of Service (QoS) by the central small cell function for at least one of: the session for which the setup request was intercepted; one or more other sessions previously established for the small cell network portion; and one or more other sessions for which another setup request has been intercepted for the small cell network portion; communicating a request to the service provider network to allocate more bandwidth for the WAN instance; and communicating a request to a location bandwidth manager within the enterprise network portion to allocate more bandwidth for the small cell network portion.

In various cases, managing QoS can include one or more of: adjusting a particular QoS level to prioritize circuit switched (CS) traffic over packet switched (PS) data traffic; adjusting a particular QoS level to prioritize Voice over Internet Protocol (VoIP) packet switched (PS) traffic over PS data traffic; and adjusting a particular QoS level for one or more radio access bearers to adjust priority between two or more sessions within the small cell network portion.

Example Embodiments

For purposes of understanding certain embodiments of systems disclosed herein, it is important to appreciate the technologies and data that may be associated with network communications. The following foundational information may be viewed as a basis from which the present disclosure can be properly explained.

Traffic (e.g., signaling/control and data traffic) for 3G Universal Mobile Telecommunications System (UMTS) small cell radio access points (APs), generally referred to as Home Node Bs (HNBs), and for 4G Long Term Evolution (LTE) small cell radio APs, generally referred to as Home evolved Node Bs (HeNBs), can be backhauled to a service provider (SP) from a variety of customer networks. In many cases, these networks are used for other purposes such as transporting Voice over Internet Protocol (VoIP) traffic and mechanisms are in place to ensure that bandwidth contention does not degrade voice quality, which typically requires tight coupling between an end application and network components.

In some cases, for example for an enterprise deployment, small cell radio APs and enterprise network devices can be deployed in a wide area network (WAN) which connects to a service provider network through a connection generally referred to as a WAN tail circuit or a last-mile circuit. For small cell radio APs, which are an extension of the service provider network, such tight coupling is not appropriate due to the nature of the tunnels between small cells embedded on-site within an enterprise deployment and a central small cell function, which may be a gateway (e.g., either a HNB gateway (HNB-GW) for 3G UMTS deployments or a HeNB gateway (HeNB-GW) for 4G LTE deployments) or a Virtualized Cluster Controller Function (VCCF) (e.g., for a virtualized small cell deployment) to which they connect. The central small cell function or VCCF is typically located external to the enterprise deployment on the service provider side of network components. As referred to herein in this Specification, the terms 'small cell radio AP', 'small cell radio' and 'small cell' can be used interchangeably.

As referred to herein in this Specification, the terms 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), virtualized functionality and/or any virtualized network controller, module, aggregator, combinations thereof or the like as described herein may execute via a hypervisor-based virtualization or a container-based virtualization of a server (e.g., blade server, rack server, stand-alone server) using the server's hardware (e.g., processor and memory element) and/or operating system for a given virtualized network environment.

In some cases, VNF(s) can be configured to perform one or more specialized operations within a network environment and one or more instances of the configured VNF(s) can be instantiated in order to execute the one or more specialized operations. In some instances, VNF(s) can include one of more virtualized network function components (VNFCs). A VNFC can be an internal component of a VNF, which can provide a VNF provider a defined subset of that VNF's functionality. As referred to herein in this Specification, the term 'decomposition' and variations thereof can be used to indicate a logical separation of various VNFs, each of which can perform certain specialized operations, among one or more virtualized network controller(s), module(s), aggregator(s), combinations thereof or any other network element that may be associated with any given virtualized network environment. A given decomposition can be realized, in an operational sense, by instantiating VNFs associated with the decomposition to execute the specialized operations as configured for the VNFs.

For current 3G UMTS enterprise deployments, HNB to HNB-GW sessions can be limited in terms of the amount of bandwidth taken by ensuring that the total number of calls from an HNB does not exceed the available capacity of the last-mile circuit. WAN bandwidth can be partitioned into different priority queues for supporting different types/priorities of traffic that can traverse the WAN. Priority queues are typically associated with VoIP sessions and can include, but not be limited to: an Expedited Forwarding (EF) queue allocated to voice traffic, an Assured Forwarding (AF) queue such as an AF23 queue allocated to video traffic or an AF24 queue allocated to immersive video traffic and a Class Selector (CS) queue allocated to telephony traffic such as a CS3 queue allocated to telepresence video. In some cases, a non-priority queue can be configured for a WAN, such as, for example, a Best Effort (BE) queue. For a BE queue, however, no guaranteed priority level may be provided for the queue; thus, traffic assigned to the queue can potentially suffer degradation. In still some cases, packets carrying voice traffic can be tagged using a Differentiated Services Code Point (DSCP) such as EF packets to ensure that they flow in the appropriate WAN queue. DSCP can also be used to tag other types of traffic such as AF or CS, where appropriate.

However, where another system such as, for example, an enterprise system is also taking bandwidth from a given priority queue, the HNB network will be unaware of allocations within the enterprise system and could use bandwidth that has been previously allocated. The same could be true in reverse and also between HNBs in a single location that share the same WAN tail circuit. When small cell calls cause the available bandwidth to be exceeded, voice calls, both small cell and enterprise voice calls, can suffer degradation due to bandwidth and/or queue exhaustion.

For an enterprise deployment, HNBs are considered an extension of the SP network placed over IP security (IPSec) tunnels within the enterprise network. In general, IPsec can use cryptographic security services to protect communications over Internet Protocol (IP) networks. In current enterprise deployments, it is not possible to interconnect over bandwidth management domains such as Resource Reservation Protocol (RSVP) as an enterprise typically implements strong management of bandwidth using systems such as a Unified Communications Manager (UCM), which can act as a Bandwidth Management Database for managing bandwidth. The Cisco Unified Communications Manager CUCM, developed by Cisco Systems, Incorporated is one type of UCM. In general, the CUCM can be made aware of the utilization of all voice, video and/or immersive video bandwidth allocations but only among enterprise communication devices for an enterprise or across circuits providing a defined Committed Information Rate (CIR).

An HNB-GW can associate each HNB for an enterprise deployment with a particular site or enterprise location and is able to determine, using Real-time Transport Protocol (RTP) how many on-going voice calls originate from a particular sire. However, current deployments of HNB-GWs do not terminate any Radio Access Network Application Part (RANAP) signaling. Thus, current HNB-GWs are not able to provide any call admission control (CAC) functionality.

Turning to FIG. 1, FIG. 1 is a simplified block diagram illustrating a communication system 100 to facilitate dynamic bandwidth allocation for wide area networks (WANs). This particular configuration may be tied to the 3rd Generation Partnership Project (3GPP) 2G and 3G architectures for General Packet Radio Service (GPRS), Circuit Switched (CS) and Packet Switched (PS) services. Alternatively, the depicted architecture may be applicable to other environments equally. For example, the architecture may be equally applicable to the 3GPP Evolved Universal Mobile Telecommunications System (UMTS) Terrestrial radio access network (E-UTRAN) architecture, which can interface with a Long Term Evolution (LTE) Evolved Packet System (EPS) core, generally referred to as 4G/LTE. In another example, the architecture may be equally applicable to a virtualization of the Radio Access Network (RAN) into one or more VNFs and one or more Physical Network Functions (PNFs) for a virtualized RAN (vRAN) architecture.

In accordance with one embodiment, communication system 100 as shown in FIG. 1 can overcome the aforementioned shortcomings (and others) by providing a solution to provide for dynamic bandwidth allocation for wide area networks (WANs) for UMTS and LTE small cells. As referred to herein in this Specification the term 'session' can include a voice call, such as a VoIP session, or a data session that is sought to be established for a given UE. In at least one embodiment, the solution provided by communication system 100 can provide a technique in which a SP small cell network can interact with existing bandwidth management functionality such as can be found in enterprise VoIP solutions to ensure that a session (e.g., VoIP session) may only proceed when sufficient bandwidth in the priority queue to which the session is classified is available such that neither existing VoIP calls nor small cell voice calls suffer degradation due to bandwidth and/or queue exhaustion.

Communication system 100 includes a wide area network (WAN) instance 110 and a service provider network 140 communicating via a service network 160. WAN instance 110 can include a small cell network 116 portion and an enterprise network 120 portion for an enterprise. In various embodiments, an enterprise could be any type of entity receiving network services from a service provider. Enterprises can include, but not be limited to, businesses, corporations, government entities, schools, universities, hospitals, event venues, convention centers, shopping centers, retail merchants, restaurants, hotels, etc. As shown in FIG. 1 different enterprise locations can be interconnected among WAN instance 110 for the enterprise. A first enterprise location (LOC 1) and a second enterprise location (LOC 2) are shown in FIG. 1. In general an enterprise location can refer to a building, a floor within a building, an area of a floor or any other location that can be geographically defined for a group or set of one or more interconnected elements for an enterprise. In various embodiments, different groups or sets of one or more interconnected elements for an enterprise can be configured in a grid system, which may provide for identifying each group or set according to a grid identification parameter and/or for signaling between HNBs (or HeNBs, depending on architecture).

As referred to herein in this Specification, the terms 'small cell network' and 'small cell network portion' can be used interchangeably. Further as referred to herein in this Specification, the terms 'enterprise network' and 'enterprise network portion' can be used interchangeably. A 'WAN instance' (e.g., WAN instance 110) as referred to herein in this Specification can refer to a particular instance of a given WAN configuration (e.g., having certain queue configurations, bandwidth configurations, etc.), which can be provided for one or more locations of an enterprise. In some embodiments, a single WAN instance can support communications between a central small cell function and a plurality of small cell radio access points. In some embodiments, the network for an enterprise can include multiple WAN instances, which can share a common WAN circuit to the service provider network and thus, bandwidth across each WAN instances needs to be managed accordingly.

WAN instance 110 includes users operating user equipment 112a-112c and HNBs 114a-114b as part of the small cell network 116 portion of WAN instance 110. WAN instance 110 may further include enterprise communication devices 122a-122e and a Unified Communications Manager (UCM) 124 as part of an enterprise network 120 portion of WAN instance 110. UCM 124 can include a Private Branch Exchange (PBX) 126 and a Location Bandwidth Manager (LBM) 128. LBM 128 can which can include or interface with an LBM interworking function (LBM-IWF) 130a and can include an LBM database 132.

Service provider network 140 includes a security gateway (SecGW) 142, which may interface with a central small cell function 144 via an IuH interface. In various embodiments, central small cell function can be a gateway (e.g., an HNB gateway for a non-virtualized 3G RAN architecture) or a Virtualized Cluster Controller (e.g., for a 3G vRAN architecture). With regard to FIG. 1, central small cell function 144 can be referred to interchangeably as an HNB-GW. Central small cell function 144 can include a Policy and Charging Enforcement Function (PCEF) 146, which may include or interface with an LBM-IWF 130b. Central small cell function 144 may further interface with a Serving GPRS Support Node (SGSN) 148, a Policy and Charging Rules Function (PCRF) 150, a Mobile Switching Center (MSC) 152, a Gateway GPRS Support Node (GGSN) 154 and a Small Cell Management System (SCMS) 156. Central small cell function 144 can facilitate the communication of circuit switched (CS) and/or packet switched (PS) traffic to/from HNBs 114a-114b and other network elements (e.g., SGSN 148, MSC 152) using standards based interfaces such as IuCS for CS traffic and IuPS for PS traffic. SGSN 148 may also interface with MSC 152 via an IuCS interface and GGSN 154 via a Gn interface. In some embodiments, SCMS 156 can interface with SGSN 148 for Authentication, Authorization and Accounting (AAA) related queries. PCRF 150 and GGSN 154 may also interface with each other.

In general, PCRF 150 may aggregate information to and from the network, operational systems, and other sources in real-time, supporting the creation of policy charging and control (PCC) rules and then automatically making policy decisions for each subscriber such as, for example, quality of service (QoS) level decisions and charging rule decisions. PCRF 150 can be configured to use user-related and subscription-related information as a basis for the policy and charging control decisions. In some embodiments, PCRF 150 may determine PCC rules based on an application or service described to the PCRF from an application function (AF). MSC 152 can facilitate session connectivity for UE CS sessions to CS resources within service provider network 140 and SGSN 148 is a data plane element that can route and forward user data packets for legacy UMTS UE. GGSN 154 may provide IP connectivity access network (IP-CAN) session connectivity for UEs to external packet data networks (PDNs), such as, for example, internet 170. GGSN 154 can also serve as policy enforcement points to manage QoS, online/offline flow-based charging, data generation, deep-packet inspection and intercept.

Each of the elements of FIG. 1 may couple to one another through simple interfaces (as illustrated) or through any other suitable communication medium (wired or wireless), which provides a viable pathway for network communications. Additionally, any one or more of these elements may be combined or removed from the architecture based on particular configuration needs. Communications mediums can include, but not be limited to, any suitable communication link such as wireless technologies (e.g., standards defined by the Institute of Electrical and Electronic Engineers (IEEE) including 802.11x and/or 802.16, Wireless Fidelity (WiFi), Bluetooth™, Near Field Communication (NFC), Dedicated Short Range Communications (DSRC), etc.), satellite technologies, microwave technologies (e.g., Worldwide Interoperability for Microwave Access (Wi-MAX), cellular technologies (e.g., 2G, 3G, 4G, LTE, LTE advanced (LTE-A), Global System for Mobile Communications (GSM) Enhanced Data Rates for GSM (EDGE), Code Division Multiple Access (CDMA), wideband CDMA (WCDMA), CDMA1x/Evolution Data Optimized (EVDO) High Speed Packet Access (HSPA), etc.) or any other suitable combination thereof.

In general, enterprise communication devices 122a-122e can communicate with various network elements of communication system 100 via UCM 124. UCM 124, including PBX 126 and LBM 128, can be a system, platform, server, etc. that can provide integrated control and management for collaboration services including, but not limited to, session and call control for voice, video, messaging, instant messaging and presence across different networks including, for example, small cell network 116 and enterprise network 120 and/or across different enterprise locations (e.g., LOC 1, LOC 2). In various embodiments, control and management across different networks and/or enterprise locations can, at least in part, be facilitated through PBX 126 and LBM 128. In various embodiments, one or more Application Programming Interfaces (APIs) can be incorporated into UCM 124, PBX 126 and or LBM 128 in order to facilitate control and management across different networks and/or enterprise locations.

PBX 126 can represent a telephone switching system that manages incoming and outgoing calls for enterprise network 120. In various embodiments, PBX 126 can be implemented as a traditional PBX, which may be connected to a public telephone system to manage call switching and routing for internal and external phone lines, or can be implemented as an IP PBX, which can manage VoIP calls as well as landline calls. In various embodiments, enterprise communication devices 122a-122e can include IP capable telephones, Public Switched Telephone Network (PSTN) or Plain Old Telephone Service (POTS) telephones (e.g., a non-IP capable telephones), printers, fax machines, computers, laptops, tablets, phablets or any other communication device capable of connecting (wired or wirelessly) to enterprise network 120.

In various embodiments, LBM 128 can provide bandwidth management of UE sessions (e.g., voice call or data) traversing WAN instance 110 via the small cell network 116 and the enterprise network 120. In at least one embodiment, LBM 128 can provide Location Call Admission Control (LCAC) operations, more generally referred to as CAC operations, among different enterprise locations sharing bandwidth from a common bandwidth pool for a network (e.g., WAN instance 110). In various embodiments, CAC operations can include, for either PS or CS calls, admitting, denying, rerouting or holding a call in 'wait' state; prioritizing CS calls over PS data traffic; and prioritizing certain call types (e.g., video, immersive video, etc.) over other call types (e.g., voice only, VoIP), or vice-versa, in order to manage bandwidth among one or more locations that share resources among a common pool of bandwidth for WAN instance 110. In some embodiments, LBM 128 can provide Enhanced Location CAC (E-LCAC) operations to provide CAC for complex networks that may include multi-tier and/or multi-hop topologies; thus, providing the ability to manage intra-location or intra-cluster bandwidth where two or more LBM domains (e.g., one LBM domain for SC, one LBM domain for enterprise Voice) may be operated at a given location. In various embodiments, LBM database 132 can be configured to store and maintain bandwidth related information for WAN instance 110, as described in further detail herein.

HNBs 114a-114b can offer suitable connectivity to one or more UE 112a-112c using any appropriate protocol or technique. In general terms, HNBs 114a-114b represents radio access point devices that can allow UEs to connect to a wired network using 2G, 3G, WiFi, WiMAX, or any other appropriate standard. Hence, the broad terms, 'small cell radio', 'radio access point' or 'small cell radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (WLAN), an HeNB, an HNB, a physical element representing a subset of functionality associated with one or more VNFs that together make up a virtualized access point or any other suitable access device, which may be capable of providing suitable connectivity to a given UE 112a-112c. In certain cases, the access point can connect to a router (via a wired network), which can relay data between the UE and other UE of the network. In general, central small cell function 144 and SecGW 142 can support HNB registration and UE registration within the small cell network. In addition, central small cell function 144 and SecGW 142 can aggregate Circuit Switched (CS) and/or Packet Switched (PS) traffic to and from HNBs 114a-114b via IuH interface processing, as prescribed by 3GPP standards.

Central small cell function 144 and SecGW 142 can exchange communications via the IuH interface. In one embodiment, central small cell function 144 and SecGW 142 can be deployed as separate devices. In another embodiment, central small cell function 144 and SecGW 142 can be deployed as a common device. In at least one embodiment, HNBs 114a-114b can perform IPsec set-ups with SecGW 142 in order to protect communications between HNBs 114a-114b, SecGW 142 and central small cell function 144 traversing WAN instance 110, service network 160 and/or service provider network 140. In various embodiments, IPsec can support network-level peer authentication, data origin authentication, data integrity, data confidentiality (encryption), and replay protection. Based on a configuration provided by SCMS 156, SecGW 142 can perform authentication and obtain an assigned IPsec address for each of HNB 114a, 114b from an IP assignment server (not shown), which could be a separate dynamic host configuration protocol (DHCP) server, a local service on SecGW 142, another IP assignment entity, etc. In various embodiments, SCMS 156 may provision HNBs 114a-114b according to a management protocol and data model. For example, in some embodiments, SCMS 156 can provision HNBs 114a-114b using technical report 069 (TR-069) protocol and using the TR-196 version 2 data model or other such management protocol and/or data model. SCMS 156 can also configure and manage HNBs 114a-114 and/or HNB clusters. In various embodiments, configuring and managing can include, but not be limited to, configuring HNB identities (IDs) (local or global), configuring cluster IDs, assigning HNB cell IDs (e.g., primary scrambling code (PSC) or the like), assigning a location area code (LAC) or routing area code (RAC) for HNBs or HNB clusters, combinations thereof or the like.

Although only two HNBs (e.g., HNBs 114a-114b) are shown in FIG. 1, it should be understood that more or less HNBs may be deployed in small cell network 116. The small cell network 116 may be made up of multiple HNBs, including HNBs 114a-114b, in order to provide 2G/3G cellular coverage for users located at an enterprise. In various embodiments, the small cell network 116 may further include one or more Home eNode B (HeNB) radio access points (not shown) in order to provide 4G/LTE cellular coverage for the small cell network.

In at least one embodiment, communication system 100 provides a linkage between central small cell function 144 and bandwidth management functionality provided via LBM 128 within an enterprise environment to ensure that the UE sessions, such as, for example, Mobile Originating (MO) sessions (e.g., sessions originated (e.g., initiated) by a given UE) and Mobile Terminating (MT) sessions (e.g., sessions initiated by the network destined to terminate or complete at a given UE), are only permitted once a setup request for each session has been approved via interactions with LBM 128 for an allocation of bandwidth for a priority queue associated with each UE sessions.

In at least one embodiment, a linkage between LBM 128 and central small cell function 144 can be provided via an LBM interworking function (IWF) such that LBM 128 can be configured with LBM-IWF 130a and central small cell function 144 can be configured PCEF 146 and LBM-IWF 130b. LBM-IWF 130a, 130b may provide an interface for exchanges between the external (e.g., external to SP network 140) bandwidth management processing of LBM 128 and the IuH processing of central small cell function 144 in order to permit, block, re-route or hold a session setup request (e.g., a MO or MT call) associated with small cell network 116. In at least one embodiment, exchanges between central small cell function 144/LBM-IWF 130b and LBM 128/LBM-IWF 130a a can be facilitated using a standard messaging protocol, such as, for example, Extensible Messaging and Presence Protocol (XMPP), Simple Object Access Protocol (SOAP) or Representational State Transfer (ReST).

In at least one embodiment, LBM-IWF 130a and LBM-IWF 130b can each respectively include one or more shared APIs, procedures, function calls, etc., which may enable LBM 128 and central small cell function 144, respectively, to exchange data or information to facilitate dynamic bandwidth allocation for WAN instance 110 for one or more priority queues. In some embodiments, dynamic bandwidth allocation can also be performed for one or more non-priority queues, such as for example, a Best Effort queue. In various embodiments, a priority queue for a particular session type can be defined based on a bandwidth requirement (e.g., how much bandwidth the particular session type consumes) and other session type requirements for the particular session type. In various embodiments, other session type requirements can define a priority queuing structure (e.g., session type priority), a drop structure (e.g., number of packets that can be dropped or re-ordered), timing requirements and/or other similar requirements. Bandwidth requirements for different session types are typically expressed in kilobits per second (Kbps).

In at least one embodiment, at deployment, start of day, power-on, initialization or re-initialization/reset of UCM 124, LBM database 132 for LBM 128 can be configured with bandwidth parameters associated with a total amount of bandwidth that is available among enterprise network points or locations (e.g., LOC 1, LOC 2) for WAN instance 110. In at least one embodiment, the configuring can include configuring LBM database 132 with priority queue information for one or more priority queues supported by WAN instance 110 for one or more types of traffic (e.g., session types) that can traverse WAN instance 110. In various embodiments, the configuration of queue information for a particular priority queue can include configuring a bandwidth requirement for the particular session type supported by the queue and one or more session type requirements.

In at least one embodiment, the configuring can further include configuring an aggregate bandwidth reserved for the small cell network 116 portion and the enterprise network 120 portion for the different priority queues supported by the WAN. By aggregate bandwidth it is meant that bandwidth reserved each network portion can be shared site-to-site across the different enterprise locations LOC 1, LOC 2, etc. for the enterprise. In various embodiments, the configuration for the aggregate bandwidth reserved among different network portions can be divided equally or unequally among the different network portions of WAN instance 110. In various embodiments, the division of aggregate bandwidth can be varied according the one or more traffic capacity or load measurements, such as for example, busy-hour call attempts (BHCA), ERLANG rating, etc.

Upon configuring the aggregate bandwidth reserved for each network portion, an aggregate amount of bandwidth reserved for each priority queue for each network portion of WAN instance 110 can be configured. In various embodiments, the configuration for the aggregate bandwidth reserved for each priority queue can be divided equally or unequally among each network portion. In various embodiments, the division of aggregate bandwidth can be varied according the one or more traffic capacity or load measurements, such as for example, BHCA, ERLANG rating, etc.

Central small cell function 144 can also store and maintain bandwidth parameters within one or more storage and/or memory element in order to perform various operations as described herein. In some embodiments, the aggregate bandwidth reserved for each priority queue can be communicated to central small cell function 144/LBM-IWF 130*b* via one or more signaling (e.g., messaging) exchanges with LBM 128/LBM-IWF 130*a*. In still some embodiments, the aggregate bandwidth reserved for the small cell network can be communicated to central small cell function 144 via one or more messaging exchanges with LBM 128/LBM-IWF 130*b*. Upon receiving the aggregate bandwidth reserved for each priority queue and/or the aggregate bandwidth reserved for the small cell network, central small cell function 144 can generate one or more messages to communicate to HNBs 114*a*-114*b* regarding the aggregate bandwidth reserved for each priority queue supported by WAN instance 110.

In essence, the aggregate bandwidth reserved for each priority queue can represent a bandwidth limit, which cannot be exceeded for each priority queue, without causing degradation to voice calls handled over WAN instance 110 (for potentially both of the small cell network and the enterprise network). In at least one embodiment, a proprietary extension can be added to the HNB Application Part (HNBAP) and/or S1 signaling protocols in order to communicate the per priority queue bandwidth limits to HNBs 114*a*-114*b*. In at least one embodiment, HNBs 114*a*-114*b* or any other small cell radios that may be deployed in the system can also store and maintain bandwidth parameters within one or more storage and/or memory element in order to perform various operations as described herein.

According to the solution provided by communication system 100, functionality can be configured for HNBs 114*a*-114*b* and the central small cell function, which are in the path for 3G CS call session setups, to provide the HNBs and the central small cell function with the capability to determine whether to permit, deny or hold establishment of a call for any UE (e.g., any of UE 112*a*-112*c*) attempting to initiate a session or to which a session is sought to be completed. Thus, as sessions are handled by HNB 114*a*-114*b* and/or central small cell function 144, the solution provided by communication system 100 will ensure that the sessions are categorized to a corresponding priority queue and permitted, denied, re-routed or held as appropriate.

During operation, for example, LBM-IWF 130*a* can be a 'touch-point' from which bandwidth metadata associated with the small cell network 116 can be extracted by central small cell function 144 via LBM-IWF 130*b*. In various embodiments, bandwidth metadata can include, but not be limited to the aggregate bandwidth reserved each priority queue for the small cell network 116, the aggregate bandwidth reserved for the small cell network 116, combinations thereof or the like.

In various embodiments, setup requests for attempted sessions can be intercepted by a small cell radio or the central small cell function 144. Which entity or element that intercepts a setup request can vary depending on one or more of: the type of setup request that has been initiated for a given UE (e.g., MO or MT), the RAN deployment architecture (e.g., non-virtualized or virtualized); and the Radio Access Technology (RAT) type (e.g., 3G or 4G) associated with the setup request. For example, in non-virtualized 3G architecture, HNBs can be configured with a cipher key, which enables them to intercept and decode MO setup requests (e.g., a Radio Resource Control (RRC) Connection Setup message, as defined in 3GPP standards) for UE. In non-virtualized 4G architectures, a setup request for an MO session for a given UE is triggered via a Session Initiation Protocol (SIP) invite, which is received by an HeNB to which the UE is connected and passed to the service provider network. However, HeNBs are not typically configured with a cipher key in order to decode SIP Invites. Therefore, setup requests associated with SIP Invites can be intercepted by a central small cell function (e.g., an HeNB-GW). In some embodiments, however, HeNBs might be configured with such a cipher key, which would enable such HeNBs to intercept and decode SIP invites in order to make a determination as to whether or not an attempted session could be established. In some embodiments, for 3G, 4G, virtualized and non-virtualized architectures, MT setup requests can be intercepted by central small cell function 144. Still yet, in some embodiments, for example for virtualized RAN architectures, a central small cell function can intercept both MO and MT setup request. In various embodiments, a setup request can include an SIP Invite, an RRC connection setup message or an E-UTRAN Radio Access Bearer (E-RAB) setup request.

In one embodiment, central small cell function 144 can generate one or more messages to communicate the aggregate bandwidth reserved for each priority queue to HNBs 114*a*-114*b*. In one embodiment, a setup request for an attempted session that is sought to be established for a given UE (e.g., a MO session) within the small cell network can be intercepted by a given HNB to which the UE is connected (or to which the UE seeks connection). In various embodiments, a setup request can be a message including one or more packets identifying one or more of a destination IP address for the call, a source IP address, session type requirements, source/destination subscription information, source/destination charging information, radio access bearer information, combinations thereof or the like. Upon intercepting the setup request, a priority queue classification can be determined by the HNB according to a session type associated with the setup request. In various embodiments, HNBs 114*a*-114*b* can also be configured with the queue information for the priority queues supported by WAN instance 110 in order to classify setup requests.

Upon determining the priority queue classification for the attempted MO session, the HNB can determine an instantaneous aggregated traffic load for the priority queue. In at least one embodiment, the HNB can determine the instantaneous aggregated traffic load for the priority queue by adding the instantaneous aggregated load for other HNBs in the small cell system. In various embodiments, grid signaling can be used to enable the HNB to determine the instantaneous aggregated load for the priority queue. For example, in one embodiment, LBM 128 can query other HNBs to determine the particular load for each for the priority queue. In another embodiment, each HNB within the small cell system can send periodic load reports to LBM 128 for each priority queue. In still other embodiments, an enterprise controller can be provided in the small network 116, as discussed in further detail herein, and the enterprise controller can perform load related queries and/or receive periodic load related reports from HNBs 114a-114b. In still other embodiments, for example, for a 4G/LTE architecture, HeNBs can perform grid signaling via an X2 interface interconnecting neighboring HeNBs. In another embodiment, LBM 128, central small cell function 144 and/or an enterprise controller can maintain a real-time sum of aggregated load for each priority queue, from which an instantaneous aggregated load can be determined at a given point in time based on a request sent by a given HNB. In still other embodiments, a Virtualized Cluster Controller Function (VCCF) can be provided in the small network 116, and the VCCF can calculate the instantaneous aggregated load related to Physical Network Function APs. In various embodiments, an instantaneous aggregated load for a given priority queue can include sessions previously setup for the queue as well as other for sessions that are currently seeking to be established for the queue for all HNBs in the small cell network.

From the instantaneous aggregated traffic load, the HNB can determine whether the priority queue has available bandwidth to establish the attempted session by subtracting the instantaneous aggregated load from the aggregate bandwidth reserved for the priority queue and comparing the result to the bandwidth requirement for the attempted session. If the available bandwidth for the priority queue is greater than or equal to the bandwidth requirement for the attempted call, then the HNB can permit the session to be established. However, if the available bandwidth for the priority queue is less than the bandwidth requirement (e.g., bandwidth for the priority queue is exhausted), then the HNB can deny the session from being established, re-route the session to another queue (e.g., a Best Effort queue) or hold the setup request for a predetermined period of time to wait for bandwidth for the priority queue to become available.

As discussed above, for non-virtualized RAN architectures, central small cell function 144 can perform similar operations for MT sessions destined to a particular UE within the small cell network or for MO sessions (e.g., for 4G architectures). For example, central small cell function 144 can intercept a setup request for an attempted session destined to a given UE within small cell network 116, classify the attempted session to a particular priority queue, determine instantaneous aggregated traffic load across all HNBs in the small cell network (e.g., HNBs 114a-114b for FIG. 1) for the particular priority queue and then determine whether bandwidth is available for the particular priority queue to support the session. For a virtualized RAN architecture, a small cell central function can intercept session requests to provide admission control for both MO and MT sessions.

In some embodiments, if a setup request is denied or held in wait, one or more remediation operations can be performed to attempt to relieve the bandwidth exhaustion for the small cell network. In some embodiments, remediation operations can include bandwidth adjustment operations or QoS management operations.

In one embodiment, for example, upon denying a session from being established or holding the call setup request in wait, a given HNB can signal to central small cell function 144 that bandwidth is exhausted for the given priority queue associated with call and central small cell function 144 via LBM-IWF 130b can generate one or more messages toward LBM-IWF 130a to request from LBM 128 more bandwidth to be allocated to the small cell network. In one embodiment, LBM 128 can calculate the instantaneous aggregated load for traffic within enterprise network 120 for one or more priority queues and/or identify one or more underutilized priority queues for the 120. If bandwidth for the enterprise network is underutilized or is underutilized for one or more particular priority queues, then LBM 128 could, in some embodiments, adjust the allocation of bandwidth between the small cell network and the enterprise network to provide more bandwidth to the small cell network for one or more priority queues. If bandwidth is available to provide to small cell network, LBM 128 could determine an updated allocation of aggregate bandwidth reserved for one or more priority queues and communicate the updated allocation for the queues and/or for the updated bandwidth allocation for the small cell network to central small cell function 144 for dissemination to HNBs 114a-114b, as described herein. Similar operations could be performed in reverse as well if the enterprise network were starved for bandwidth while the small cell network was underutilized.

In another embodiment, for example, upon denying a session from being established or holding the session setup request in wait, central small cell function 144 could generate one or more messages toward SCMS 156 requesting more bandwidth to be allocated to WAN instance 110. If more bandwidth is available to allocate to WAN instance 110, an updated bandwidth allocation could be communicated to LBM 128 to update the aggregate bandwidth reserved across the small cell network 116 and enterprise network 120 as well as the aggregate bandwidth reserved for the priority queues supported across the WAN instance 110.

In addition to integrating CAC functionality for small cell radio session handling, the solution provided by communication system 100 also enables central small cell function 144 to become a QoS enforcement entity, via PCEF 146, to negotiate or modify the QoS level for small cell radio traffic based on exchanges with LBM 128/LBM-IWF 130a and/or PCRF 150. In current deployments, neither an HNB nor an HNB-GW play a role in radio access bearer (RAB) initiation/termination procedures, QoS negotiation or QoS modification based on voice, video, data, etc. call type or traffic bandwidth availability on an enterprise level because the HNB-GW has no enterprise level knowledge. Moreover, in current deployments, an LBM within a UCM merely provides management of intra-UCM call flows but does not provide an interface to a PCRF.

However, the solution provided by communication system 100 provides that LBM-IWF 130b/PCEF 146 within central small cell function 144 can be recognized as a policy and charging enforcement point to PCRF 150, thereby enabling remediation operations including QoS negation and/or QoS modification operations to be carried out by central small cell function 144 in an attempt to relieve bandwidth exhaustion for one or more priority queues. Moreover, the solution provided by communication system 100 provides for the ability to expose traffic types for the small cell network to enterprise side processing or to the service provider side processing, thereby enabling features such as flow-based charging, data generation, deep-packet inspection and intercept for small cell traffic.

In at least one embodiment, providing central small cell function 144 with visibility of enterprise level and small cell level traffic may enable central small cell function 144, as a signaling entity, to initiate one or more radio access bearer (RAB) procedures towards a packet core (e.g., GPRS or EPS) as well as towards an small cell radio access point (e.g., an HNB, etc.) to negotiate PS traffic load and/or adjust QoS level in order to prioritize traffic flows for the small cell network 116 portion of WAN instance 110. In one embodiment, for example, central small cell function 144 can prioritize CS traffic over PS data session traffic in order to provide priority to CS voice calls.

The QoS negotiation and/or modification features can be extended beyond remediation operations for CAC-type scenarios. In particular, the solution provided by communication system 100 provides not only for building a hard-allocation of bandwidth where other services such a UCM exist on shared enterprise/service provider infrastructure, but the QoS management features of the solution can be used in a standalone fashion to manage voice and video bandwidth allocations within a non-enterprise small cell radio/central small cell function system. In at least one embodiment, standalone QoS management features could find applicability where QoS Class Identifiers (QCIs) across a RAN can be declared. In such an embodiment, the standalone QoS management features could be used to ensure that the required RAN QoS could be matched by circuits in a WAN, for example, in concert with the PCRF. In another embodiment, the standalone solution provided by incorporating a PCEF into a central small cell function could be used to generically manage bandwidth allocations in a cellular deployment system.

Accordingly, the solution provided by communication system 100 can provide several advantages over existing enterprise deployments. In at least one embodiment the solution provided by communication system 100 can enable the installation of HNBs and/or other small cell radios within an enterprise where a hard-allocation of queues (e.g., EF, AF23, CS3, etc.) on WAN circuit is provided. Without the solution provided by communication system 100, it is likely that voice QoS on existing IP telephony systems and voice quality on existing HNB systems would suffer, having no way of exchanging queue utilization between the environments. Thus, the solution provided by communication system 100 can provide a method for the generic allocation of voice, video, high-bandwidth immersive video, etc. over WAN tail circuits where there is currently no automatic bandwidth management in place.

Further, where bandwidth is being controlled and managed across WAN circuits in a hard-allocation method such as within an enterprise, it is important to maintain enterprise Service Level Agreements (SLAs) and mobile network operator (MNO) Key Performance Indicators (KPIs) to ensure that any additional demands on capacity are properly admitted, denied or held until capacity is available to handle the additional demands. Thus, the solution provided by communication system 100 may serve as a 'touch-point' between existing enterprise bandwidth management systems and a central small cell function serving a small cell radio deployment in order to effectively and efficiently manage bandwidth for a WAN.

In general, WAN instance 110, small cell network 116, enterprise network 120, service provider network 140, service network 160, and internet 170 may offer communicative interfaces between various elements of communication system 100 and may be any local area network (LAN), wireless local area network (WLAN), metropolitan area network (MAN), virtual private network (VPN), Radio Access Network (RAN), Intranet, extranet, or any other appropriate architecture or system that facilitates communications in a network environment. In various embodiments, service network 160 may implement user datagram UDP/IP connections and TCP/IP communication language protocol in particular embodiments of the present disclosure. However, communication network may alternatively implement any other suitable communication protocol for transmitting and receiving data packets within communication system 100. In various embodiments, service network 160 and internet 170 can be multiple networks interconnected via one or more network appliances, elements, gateways, etc. In one or more embodiments, service network 160 may overlap with and/or be included within internet 170.

Communications in a network environment are referred to herein as 'network traffic' or 'traffic', which may be inclusive of packets. A packet is a formatted unit of data and can contain both control information (e.g., source and destination address, etc.) and data, which is also known as payload. Network traffic can be sent and received according to any suitable communication messaging protocols. Suitable communication messaging protocols can include a multi-layered scheme such as the Open Systems Interconnection (OSI) Model, or any derivations or variants thereof. For example, communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs. Other protocols or interfaces that can be used in communication system 100 can include 3GPP DIAMETER-based protocols, a remote authentication dial in user service (RADIUS) protocol, a service gateway interface (SGi), a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP), Generic Route Encapsulation (GRE), etc. The terms 'data' and 'information' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, service provider network 140 may include other elements, gateways, etc. that may make up 2G and 3G architectures for GPRS, CS and/or PS services, which can include, but not be limited to, a Home Location Register (HLR) or one or more Authentication, Authorization and Accounting (AAA) elements. In various embodiments, service provider network 140 may include other elements, gateways, etc. that may make up 4G/LTE architectures for EPS, CS and/or PS services, which can include, but not be limited to, one or more Mobility Management Entities (MMEs), a serving gateway (SGW) a Packet Data Network (PDN) gateway (PGW) or a combined serving/PDN gateway (S/P-GW) and a Home Subscriber Server (HSS) as prescribed by 3GPP standards. These elements, gateways, etc. may be included in service provider network 140 to provide various UE services and/or functions, such as, for example, to implement QoS on packet flows, to provide connectivity for UE 112a-112c to external data packet networks such as internet 170, to provision CS voice routing, to provision PS data routing, to provide enhanced services such as enhanced charging, stateful firewalls and/or traffic performance optimization (TPO), etc. These elements, gateways, etc. are not shown in service provider network 140 in order to highlight other features of communication system 10.

In various embodiments, UE 112a-112c can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 100. UE 112a-112c may also be inclusive of a suitable interface to a human user such as a microphone, a display, a keyboard, or other terminal equipment.

UE 112a-112c may also be any device that seeks to initiate a communication on behalf of another entity or element such as a program, a database, or any other component, device, element, or object capable of initiating an exchange within communication system 100. In certain embodiments, UE 112a-112c may have a bundled subscription for network access and application services (e.g., voice), etc. Once the access session is established, the user can register for application services as well, without additional authentication requirements. UE IP addresses can be assigned using dynamic host configuration protocol (DHCP), Stateless Address Auto-configuration (SLAAC), during default bearer activation processes, etc., or any suitable variation thereof. In various embodiments, each UE 112a-112c can include one or transmitters and/or receivers (e.g., transceivers) and one or more antenna(s) to facilitate wireless, over-the-air (OTA) communications with and/or handover between one or more of HNBs 114a-114b and/or one or more macro cell radios.

Figure 2A:
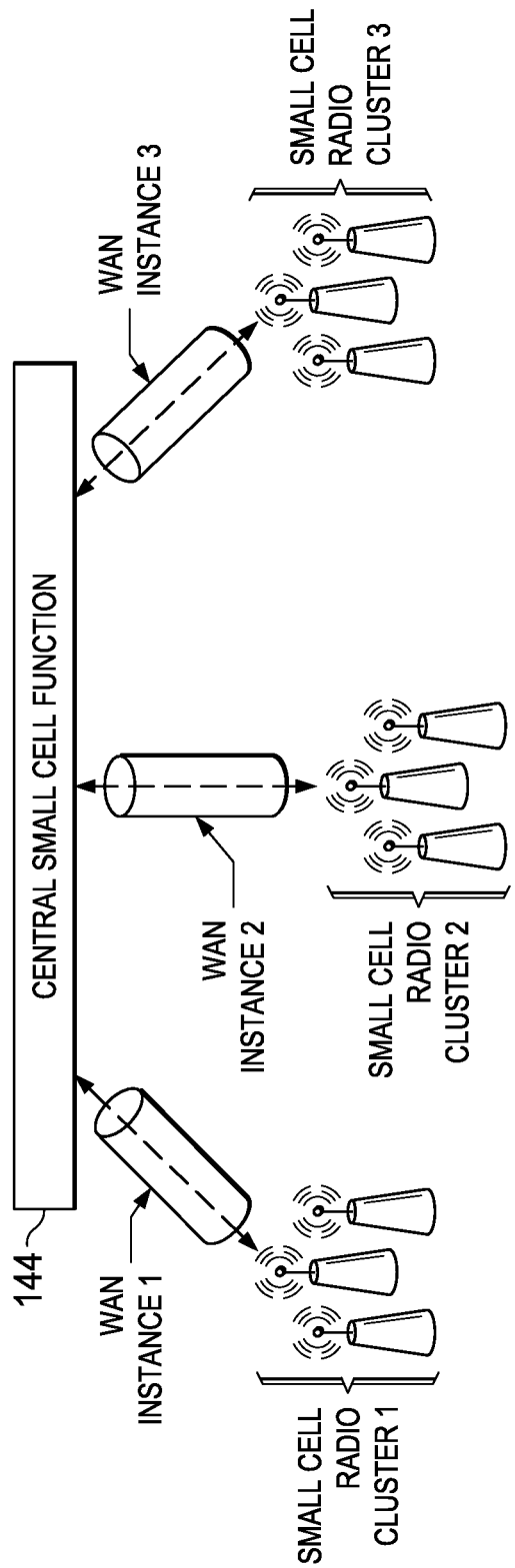
FIGS. 2A-2B are simplified blocks diagram illustrating example details that can be associated with various potential embodiments.
Figure 2B:
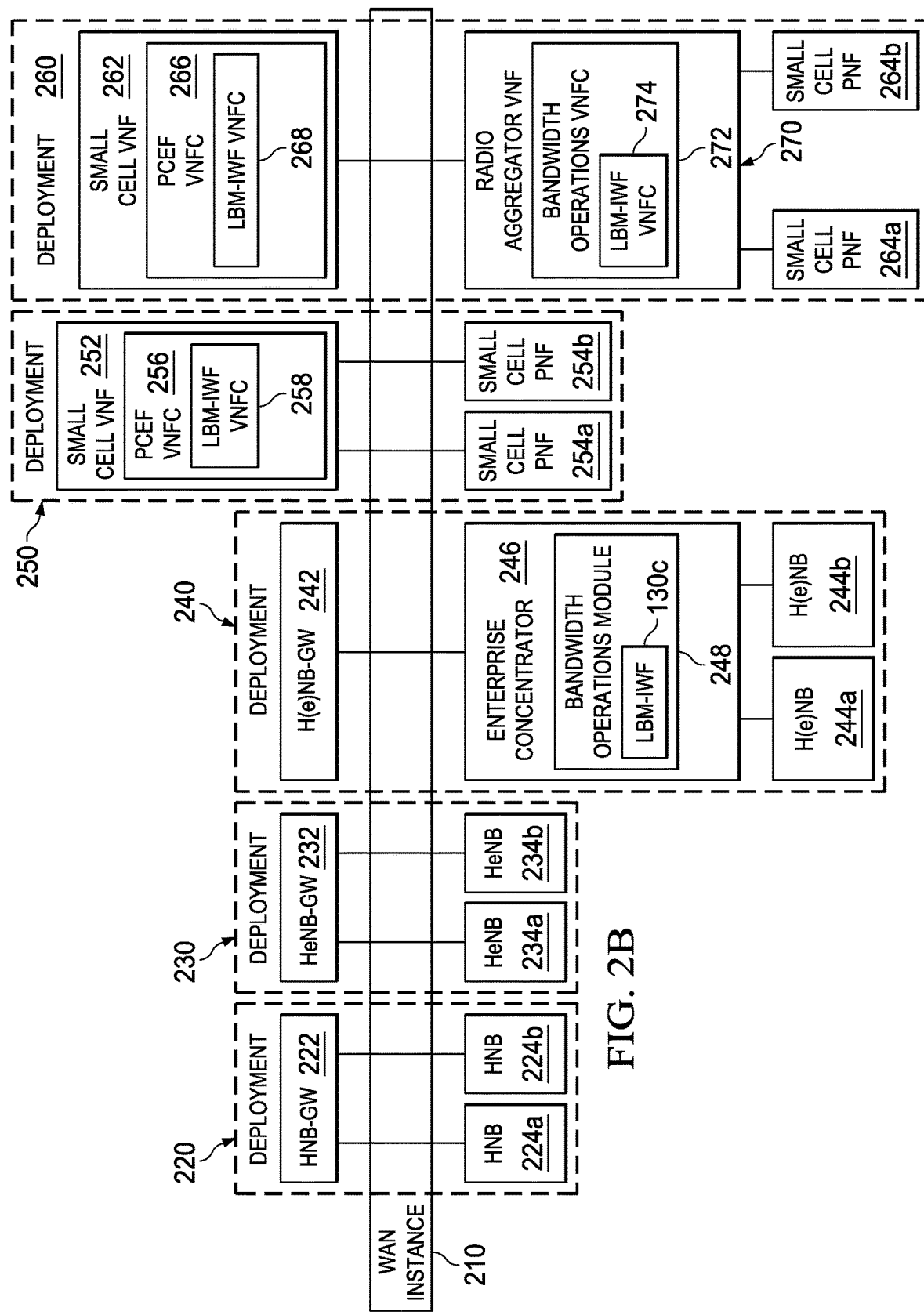

Turning to FIGS. 2A-2B, FIGS. 2A-2B are simplified block diagrams illustrating example details that can be associated with various potential embodiments of communication system 100. Referring to FIG. 2A, FIG. 2A illustrates an architecture in which central small cell function 144 can aggregate traffic across multiple WAN instances. As shown in FIG. 2A, a first WAN instance (WAN instance 1) provides a first interface between central small cell function 144 and a first cluster (Cluster 1) of small cell radios, a second WAN instance (WAN instance 2) provides a second interface between central small cell function 144 and a second cluster (Cluster 2) of small cell radios and a third WAN instance (WAN instance 3) provides a third interface between central small cell function 144 and a third cluster (Cluster 3) of small cell radios.

In various embodiments, each WAN instance can be allocated an amount of bandwidth, which can be divided among one or more priority queues and/or a Best Effort queue. During operation, central small cell function 144 via LBM-IWF 130b can interface with LBM 128 via LBM-IWF 130a to provide CAC for each WAN instance 1-3. In some embodiments, operations in a multi-WAN architecture can include central small cell function 144 classifying an intercepted session request to a particular small cell radio and to a particular WAN instance associated with the particular small cell radio. In various embodiments, central small cell function 144 can be configured with mapping information via SCMS 156, which can identify an association of small cell radios and/or small cell radio clusters and corresponding WAN instances based on a location of each small cell radio or small cell radio clusters. In various embodiments, location the location of one or more small cell radios and/or small cell radio clusters can be associated with one or more WAN instances using location information, which can include, Global Positioning System (GPS) coordinates, latitude/longitude coordinates, cell IDs, grid IDs, cluster IDs, combinations thereof or the like.

The classification of an intercepted session request to a particular small cell radio and WAN instance can aid in the determination of available bandwidth for the particular priority queue for allocated to particular WAN instance. As described herein, the determination of available bandwidth can be facilitated through one or more exchanges between central small cell function 144/LBM-IWF 130b and LBM 128/LBM-IWF 130a. Thus, as shown in FIG. 2A, central small cell function 144 can provide CAC for multiple small cell radios and/or multiple small cell radio clusters across multiple WAN instances, each of which may be provided a corresponding allocation of bandwidth for one or more priority queues and/or one or more non-priority (e.g., Best Effort) queues.

Referring to FIG. 2B, FIG. 2B illustrates small cell deployments that can be realized across a WAN instance 210. In one embodiment, a first deployment 220 can include an HNB-GW 222, which interfaces across WAN instance 210 with HNBs 224a-224b for a non-virtualized 3G RAN architecture. Although not illustrated in FIG. 2B, HNB-GW 222 can, in one embodiment, be configured with a PCEF and an LBM-IWF, similar to central small cell function 144 as shown in FIG. 1. In another embodiment, a second deployment 230 can include an HeNB-GW 232, which interfaces across WAN instance 210 with HeNBs 234a-234b for a non-virtualized 4G/LTE RAN architecture. Although not illustrated in FIG. 2B, HeNB-GW 232 can, in one embodiment, be configured with a PCEF and an LBM-IWF, similar to central small cell function 144 as shown in FIG. 1.

In yet another embodiment, a third deployment 240 can include an H(e)NB-GW 232 [note, in various embodiments, H(e)NB-GW 232 can be an HNB-GW for a 3G architecture, an HeNB-GW for a 4G/LTE architecture or can be configured with functionality to support both 3G and 4G/LTE architectures], which interfaces across WAN instance 210 with H(e)NBs 244a-244b via an enterprise concentrator 246 for a non-virtualized 3G and/or 4G RAN architecture. Third deployment 240 can be associated with an enterprise deployment for a small cell network. Although not illustrated in FIG. 2B, H(e)NB-GW 242 can, in one embodiment, be configured with a PCEF and an LBM-IWF, similar to central small cell function 144 as shown in FIG. 1. In various embodiments, enterprise concentrator 246 can serve to aggregate traffic for H(e)NBs 244a-244b. Enterprise concentrator 246 can include a bandwidth operations module 248, which can be configured with an LBM-IWF 130c. In various embodiments, enterprise concentrator 246 can also interface with a UCM (e.g., UCM 124) and an LBM (e.g., LBM 128) for an enterprise deployment. In at least one embodiment, enterprise concentrator 246 via bandwidth operations module 248 and LBM-IWF 130*c* can perform various bandwidth management related functions including, but not limited to, signaling H(e)NBs 244*a*-244*b* to determine instantaneous loads for one or more priority queues supported by WAN instance 210, calculating instantaneous aggregated loads for one or more priority queues supported by WAN instance 210, interfacing with an LBM/LBM-IWF for one or more bandwidth management related operations, interfacing with H(e)NB-GW 242 (including a corresponding PCEF and LBM-IWF) and/or interfacing with a SecGW (e.g., SecGW 142) for various dynamic bandwidth allocation operations as discussed herein.

In yet another embodiment, a fourth deployment 250 can include a small cell virtualized network function (VNF) 252, which interfaces with small cell physical network functions (PNFs) 254*a*-254*b* for a 3G and/or 4G/LTE vRAN architecture. In at least one embodiment, small cell VNF 252 can be configured with a PCEF Virtualized Network Function Component (VNFC) 256, which can perform operations similar to PCEF 146 for central small cell function 144 and PCEF VNFC 256 can be configured with an LBM-IWF VNFC 258, which can perform operation similar to LBM-IWF 130*b* for PCEF 146. In various embodiments, PNFs 254*a*-254*b* can be configured as small cell radio access points to provide connectivity to one or more UE for a small cell deployment.

In yet another embodiment, a fifth deployment 260 can include a small cell VNF 262, which interfaces with small cell PNFs 264*a*-264*b* via a radio aggregator VNF 270. In at least one embodiment, small cell VNF 262 can be configured with a PCEF VNFC 266, which can perform operations similar to PCEF 146 for central small cell function 144 and PCEF VNFC 266 can be configured with an LBM-IWF VNFC 268, which can perform operation similar to LBM-IWF 130*b* for PCEF 146. In various embodiments, radio aggregator VNF 270 can serve to aggregate traffic for small cell PNFs 264*a*-264*b*. Radio aggregator VNF 270 can include a bandwidth operations VNFC 272, which can be configured with an LBM-IWF VNFC 274. In one embodiment, radio aggregator VNF 270 can also interface with a UCM (e.g., UCM 124) and an LBM (e.g., LBM 128) for an enterprise deployment. In at least one embodiment, radio aggregator VNF 270 via bandwidth operations VNFC 272 and LBM-IWF VNFC 274 can perform various bandwidth management related functions including, but not limited to, signaling small cell PNFs 264*a*-264*b* to determine instantaneous loads for one or more priority queues supported by WAN instance 210, calculating instantaneous aggregated loads for one or more priority queues supported by WAN instance 210, interfacing with an LBM/LBM-IWF for one or more bandwidth management related operations, interfacing with small cell cell VNF 262 (including a corresponding PCEF and LBM-IWF) and/or interfacing with a SecGW (e.g., SecGW 142) for various dynamic bandwidth allocation operations as discussed herein. Thus, as illustrated in FIGS. 1, 2A and 2B, embodiments of the present disclosure can be applied to and supported across a variety of deployment types for one or more WAN instances.

Figure 3:
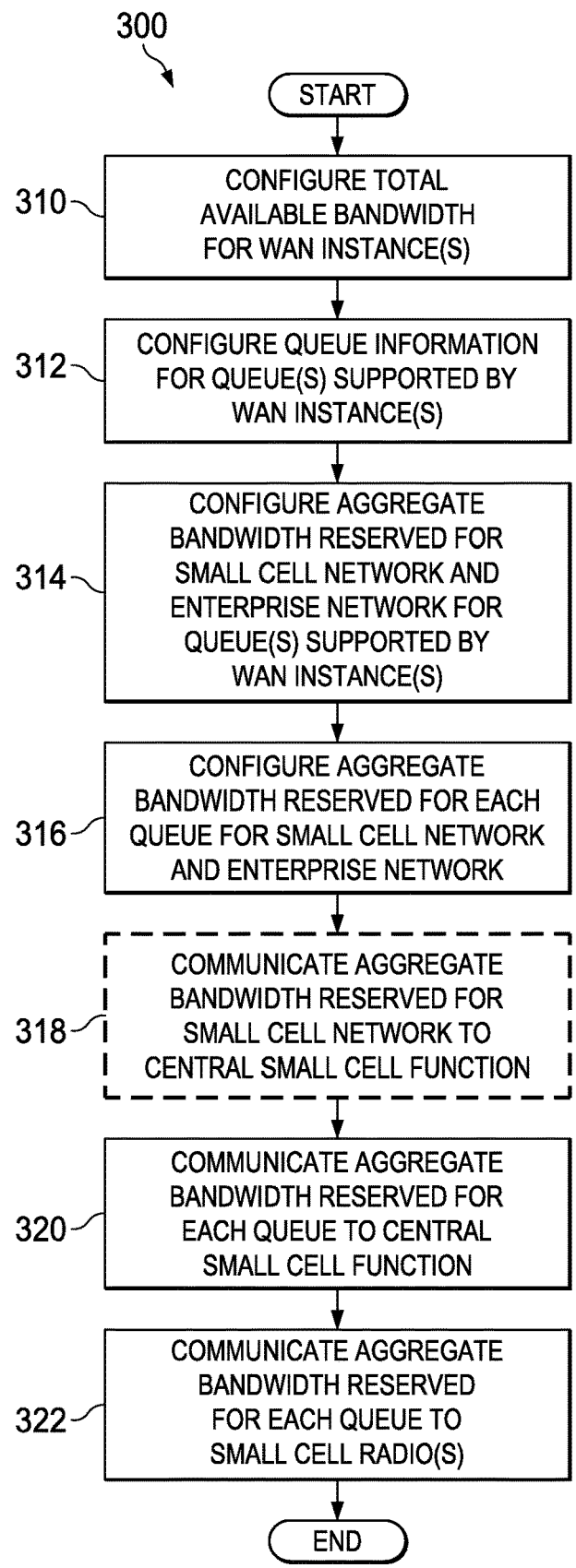
FIG. 3 is a simplified flow diagram illustrating example operations that can be associated with providing dynamic bandwidth allocation over a WAN instance in accordance with one potential embodiment.

Turning to FIG. 3, FIG. 3 is a simplified flow diagram illustrating example operations 300 that can be associated with providing dynamic bandwidth allocation for one or more WAN instance(s) (e.g., any of WAN instance 110 as shown in FIG. 1, 210 as shown in FIG. 2A or WAN instances 1-3 as shown in FIG. 2B) in accordance with one potential embodiment. In particular, operations 300 can be associated with configuring bandwidth parameters associated with aggregate bandwidth limits for a small cell network portion (e.g., small cell network portion 116 of FIG. 1) and an enterprise network portion (e.g., enterprise network portion 120 of FIG. 1) of the WAN instance(s) for one or more priority queues supported across one or more enterprise locations (e.g., LOC 1, LOC 2).

In at least one embodiment, at deployment, start of day, power-on, initialization or re-initialization/reset of a UCM (e.g., UCM 124) an LBM database for an LBM (e.g., LBM database 132 for LBM 128) is configured at 310 with bandwidth parameters associated with a total amount of bandwidth that is available among enterprise network points or locations (e.g., LOC 1, LOC 2) for the WAN instance(s). In various embodiments, the configuring operations as described for the embodiment shown in FIG. 3 can be performed by a network operator, service provider or the like; by other functionality within the LBM and/or UCM; by a network element or functionality within a service provider network (e.g., service provider network 140); combinations thereof or the like.

At 312, the LBM database is configured with queue information for one or more queues (e.g., priority and Best effort, if configured) supported by the WAN instance(s) for one or more types of traffic (e.g., types of calls) that can traverse the WAN instance(s). In at least one embodiment, configuring queue information for a particular priority queue can include configuring a bandwidth requirement for the particular session type supported by the queue and one or more session type requirements (e.g., number of packets that can be dropped or re-ordered, a priority structure, timing requirements, etc.).

At 314, the LBM database is configured with the aggregate bandwidth reserved for the small cell network portion and the enterprise network portion for the different queues supported by the WAN instance(s). In various embodiments, the configuration for the aggregate bandwidth reserved among different network portions can be divided equally or unequally among the different network portions of the WAN instance as described herein. At 316, the LBM database is configured with the aggregate bandwidth reserved for each queue for each network portion (e.g., small cell and enterprise) of the WAN instance(s). In various embodiments, the configuration for the aggregate bandwidth reserved for each queue can be divided equally or unequally among each network portion as described herein.

At 320, the aggregate bandwidth reserved for each queue can be communicated to a central small cell function (e.g., central small cell function 144) via one or more messages exchanged between an LBM-IWF for the LBM and an LBM-IWF for the central small cell function 144. In some embodiments, as shown at 318, the aggregate bandwidth reserved for the small cell network itself can be communicated to the central small cell function via one or more messages exchanged between the LBM-IWF for the LBM and the LBM-IWF for the central small cell function. At 322, the central small cell function can generate one or more messages to communicate to small cell radios in small cell network (e.g., HNBs 114*a*-114*b*, etc. depending on deployment) regarding the aggregate bandwidth reserved for each priority queue supported by the WAN instance(s) and the operations can end.

Figure 4:
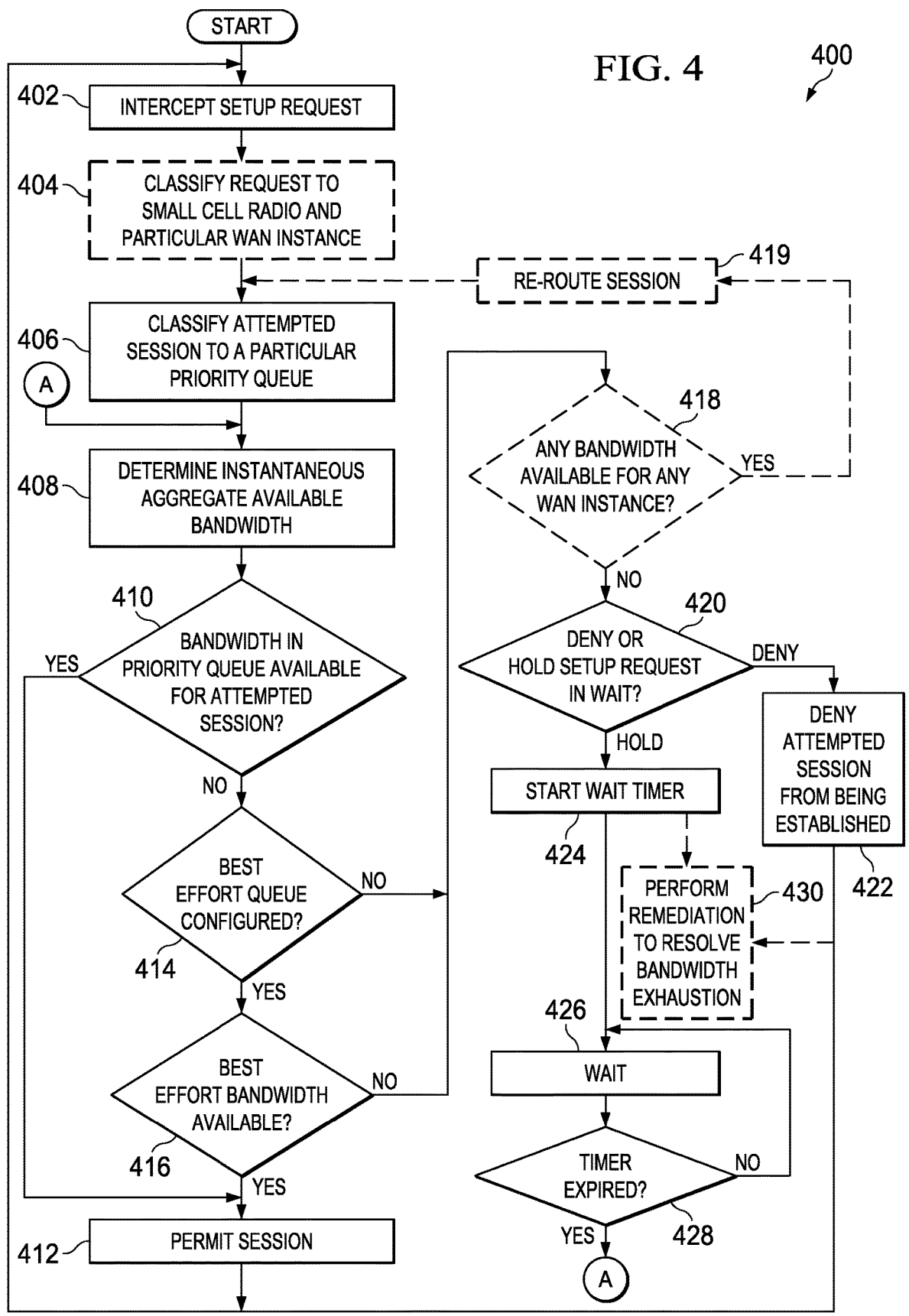
FIG. 4 is a simplified flow diagram illustrating example operations that can be associated with providing dynamic bandwidth allocation over a WAN instance in accordance with one potential embodiment.

Turning to FIG. 4, FIG. 4 is a simplified flow diagram illustrating example operations 400 that can be associated with providing call admission control in a small cell network portion (e.g., small cell network 116 portion) of a given WAN instance (e.g., any of WAN instance 110 as shown in FIG. 1, 210 as shown in FIG. 2A or WAN instances 1-3 as shown in FIG. 2B) in accordance with one potential embodiment. In various embodiments, operations 400 can be performed by any of one or more small cell radios (e.g., HNBs 114a-114b, etc. depending on deployment) or a central small cell function (e.g., central small cell function 144) depending on the type of setup request that has been initiated (e.g., MO or MT) for a given UE, the RAN deployment architecture (e.g., non-virtualized or virtualized) and/or the RAT type (e.g., 3G or 4G) associated with the setup request as discussed herein. Operations 400 described for the embodiment of FIG. 4 assume that an LBM database for an LBM (e.g., LBM database 132 for LBM 128) has been configured with queue and bandwidth information as described herein.

At any time, a setup request can be initiated (e.g., a UE initiated request for a MO VoIP session or a network initiated request for a MT VoIP session) for one or more UE served by the small cell network portion of the WAN instance. Accordingly, operations can begin at 402 in which a setup request is intercepted for an attempted session that is sought to be established for a given UE.

In some embodiments, for a multi-WAN instance architecture, for example, the operations can include classifying the setup request to a particular small cell radio and a corresponding WAN instance associated with the particular small cell radio, as shown at 404, based on the location of the particular small cell radio. As discussed herein, central small cell function 144 or any other central small cell function that may be deployed in an environment can be configured via SCMS 156, which can identify an association of small cell radios and/or small cell radio clusters and corresponding WAN instances based on a location of each small cell radio or small cell radio clusters.

At 406, the operations can include classifying the attempted session associated with the setup request to a particular priority queue (e.g., a priority queue for the session). In one embodiment, the classification can be performed based on session type requirements configured at the small cell radio, central small cell function and/or small cell VNF for each priority queue supported by the WAN instance. At 408, the operations can include determining an instantaneous aggregate available bandwidth for the particular priority queue associated with the session setup request. Other operations regarding determining the instantaneous aggregate available bandwidth for the priority queue are discussed in further detail below with regard to FIG. 5.

At 410, the operations can include determining whether there is bandwidth in the particular priority queue available for the attempted session associated with the setup request. In at least one embodiment, the determining at 410 can include comparing the bandwidth requirement associated with the session to the instantaneous aggregate available bandwidth determined at 408. If the bandwidth requirement for the attempted session is less than or equal to the instantaneous aggregate available bandwidth, the operations can continue to 412 in which the attempted session is permitted to be established.

In one embodiment, permitting a session to be established can include allocating bandwidth for a particular priority queue associated with the session via the LBM database to support traffic for the session. By allocating, it is meant that bandwidth for the session can be reserved for the particular priority queue to support traffic for the session. In various embodiments, allocating can include one or more database-dip or decrement stack operations of the aggregate available bandwidth for the particular priority queue maintained within bandwidth parameters of the LBM database. In some embodiments, permitting a session to be established can include prioritizing sessions. For example, in at least one embodiment, CS call sessions can be prioritized over PS data sessions for the small cell network.

In still some embodiments, permitting a session to be established can include updating a value of the aggregate available bandwidth for the particular priority queue to reflect the bandwidth allocated for the session that was permitted to be established. In at least one embodiment, the updating can include maintaining a real-time sum of the aggregate bandwidth in-use and which is sought to be used for a particular priority queue or decrementing from the total aggregate bandwidth reserved for the particular priority queue the amount of bandwidth that has been allocated for previously established sessions and sessions that are currently seeking to be established. In some embodiments, each small cell radios can maintain a local tabulation of bandwidth in-use and which is currently sought to be used for each priority queue and can communicate the local tabulation to the LBM and/or the central small cell function on a periodic basis or as queried by one or more of these devices for updating bandwidth parameters within LBM database 132.

Upon permitting the session to be established, the operations can return to 402 in which another setup request can be intercepted for another session another that is sought to be established for a UE within the small cell network.

Recalling 410, if the bandwidth requirement for the attempted session is greater than the available bandwidth for the particular priority queue, operations can continue to 414 in which a determination is made regarding whether a Best Effort queue has been configured for the WAN instance. In various embodiments, an administrative policy can be configured for the LBM and can be used to determine whether to attempt to allocate a session to a Best Effort queue. In various embodiments, the administrative policy can include one or more session types, a particular user or class of users seeking to establish a session, one or more location parameters, one or more timing parameters (e.g., time of day, etc.), one or more loading parameters, combinations thereof or the like that can be used to determine whether to attempt to allocate a session to a Best Effort queue. If a Best Effort queue has been configured and the session type is allowed to be allocated to the Best Effort queue, the operations can continue to 416 in which a determination is made as to whether there is available bandwidth for the Best Effort queue to support the attempted session. In one embodiment, the determination at 416 can include determining an instantaneous aggregate available bandwidth for the Best Effort queue for the WAN instance and comparing the bandwidth requirement associated with the attempted session to the instantaneous aggregate available bandwidth for the Best Effort queue.

If bandwidth for the Best Effort queue is available, operations can continue to 412 in which the attempted session is permitted to be established and operations similar to those as described for a priority queue can be performed with respect to the Best Effort queue. However, for a session that is allowed to be established for the Best Effort queue, quality (e.g., voice quality, video quality, etc.) could suffer as the Best Effort queue may not be configured to provide service at the level required by the session.

In some embodiments, as discussed herein, multiple WAN instances can be configured for a deployment. If multiple WAN instances are configured for a deployment, then then at 414, if no Best Effort queue has been configured, or at 416, if there is no bandwidth available for the Best Effort queue, the operations can, in one embodiment, continue to 418 in which a determination can be made regarding whether there is any bandwidth available in another WAN instance for the session. In some embodiments, for example, multiple WAN instances can be configured for the network of an enterprise. Thus, another WAN instance may have available bandwidth for the session. In various embodiments, signaling exchanges can be performed across WAN instances between the device intercepting the session request and LBMs for each WAN instance to determine whether any bandwidth is available to support the session. It is assumed for such embodiments that appropriate LBM-IWFs are configured to facilitate such signaling exchanges. If any bandwidth is available to support the session, then the session can be re-routed at 419 across a path that can support the session and the operations can return to 406 in which the request is classified to a particular priority queue for the new (re-routed) WAN instance. If there is no bandwidth available for any other WAN instance in this embodiment, operations can continue to 420. In one embodiment, re-routing can include mapping the request to a particular small cell radio for the re-routed WAN instance.

Otherwise if there are not multiple WAN instances configured, the operations continue to 420 in which a determination is made as to whether the setup request is to be denied altogether or is to be held in a wait state. In various embodiments, an administrative policy, as discussed above, can be configured that can be used to determine whether a setup request is to be denied altogether or is to be held in a wait state for a period of time.

If the setup request is to be denied, the operations can continue to 422 in which the attempted session is denied from being established and the operations can return to 402 in which another setup request can be intercepted for another attempted session that is sought to be established for a UE within the small cell network. In one embodiment, the denying can include communicating a setup response message indicating that the attempted session failed to be setup. However, if the setup request is to be held in the wait state, the operations can continue to 424 in which a wait timer can be started. In various embodiments, the wait timer can be configured to wait a period of time, which can vary from approximately 1 second to approximately 10 seconds. In one embodiment, the period of time can be set based on the GSM timer T303, as defined in 3GPP standards, which can last up to 10 seconds. Wait operations can continue through 426 and 428 in which the setup request can be held in wait until expiration of the wait timer. In at least one embodiment, setup requests can be held in a wait queue, which can be configured within memory, storage, combinations thereof or the like for small cell radios (e.g., HNBs, HeNBs, etc.) and the central small cell function. Upon expiration of the wait timer, the operations can return to 408 and 410 in which another determination is made as to whether bandwidth for the particular priority queue is available to support traffic for the attempted session.

In some embodiments, as shown at 430, the operations can include performing one or more bandwidth remediation operations if the setup request is denied or held in wait in an effort to free up bandwidth and/or re-prioritize traffic for the WAN instance. In some embodiments, for example, if the decision to deny or hold a setup request is made by a small cell radio (e.g., HNB 114a or 114b), then operations 430 can include generating one or more messages to communicate to central small cell function 144 regarding the decision, in which case one or more remediation operations can be performed out via central small cell function 144. In various embodiments, remediation operations can include, but not be limited to, requesting, via an LBM-IWF signaling exchange, that additional bandwidth be allocated to the small cell network 116 portion by the LBM 128; requesting that additional bandwidth be allocated to the WAN or a WAN instance from service provider network 140, performing one or more QoS management operations, combinations thereof or the like as discussed in further detail herein.

Figure 5:
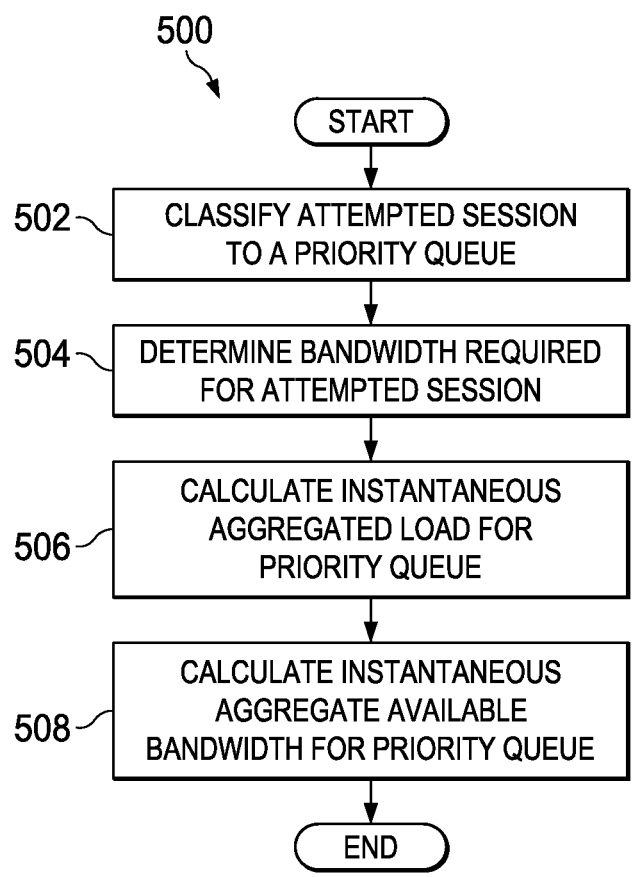
FIG. 5 is a simplified flow diagram illustrating other example operations that can be associated with providing dynamic bandwidth allocation over a WAN instance in accordance with one potential embodiment.

Turning to FIG. 5, FIG. 5 is a simplified flow diagram illustrating other example operations 500 that can be associated with providing call admission control in a small cell network portion of a WAN instance in accordance with one potential embodiment. In particular, the embodiment shown in FIG. 5 illustrates operations 500 that can be associated with determining an instantaneous aggregate available bandwidth for a particular priority queue. In various embodiments, operations 500 assume that a setup request has been intercepted for an attempted session that is sought to be established for a given UE within a small cell network. Some operations 500 associated with the embodiment shown in FIG. 5 can be performed by any of a small cell radio (e.g., an HNB, HeNB, etc.) or a central small cell function (e.g., central small cell function 144) depending on the type of setup request (e.g., MO or MT) that has been initiated for a given UE, the RAN deployment type (e.g., non-virtualized or virtualized) and/or the RAT type (e.g., 3G or 4G) associated with the setup request as discussed herein. For purposes of illustration only for the embodiment shown in FIG. 5, some operations are described with reference to a given small cell radio, such as, for example HNB 114a, which is assumed to have intercepted a setup request for an MO call for a given UE, say, for example, UE 112a.

At 502, the operations can include HNB 114a classifying the attempted session associated with the setup request received from UE 112a to a particular priority queue based on the session type of the attempted session. At 504, HNB 114a can determine a bandwidth requirement for the attempted session from the associated session type.

At 506, the operations can include calculate an instantaneous aggregated load for the particular priority queue. In one embodiment, HNB 114a can calculate the instantaneous aggregated load by summing load information signaled to HNB 114a from LBM 128, central small cell function 144 and/or an enterprise concentrator regarding the instantaneous loads for different enterprise locations and/or for each HNB in the small cell network for the particular priority queue. In another embodiment, LBM 128, central small cell function 144 and/or an enterprise concentrator can maintain a real-time sum of aggregated load for each priority queue, from which an instantaneous aggregated load can be determined at a given point in time based on a request sent by a given small cell radio (e.g., HNB 114a). In yet another embodiment, say for a 4G RAT architecture, for example, HeNBs can signal load information to each other for a particular priority queue via an X2 interface interconnected each HeNB.

At 508, the operations can include calculating an instantaneous aggregate available bandwidth for the particular priority queue. In one embodiment, the calculating can include subtracting the instantaneous aggregated load from the aggregate bandwidth reserved for the particular priority queue. From the instantaneous aggregate available bandwidth, a determination can be made as to whether the attempted session can be allowed, denied, re-routed or held for a period of time, as described for various embodiments discussed herein (e.g., as discussed for the embodiment shown in FIG. 4).

Figure 6A:
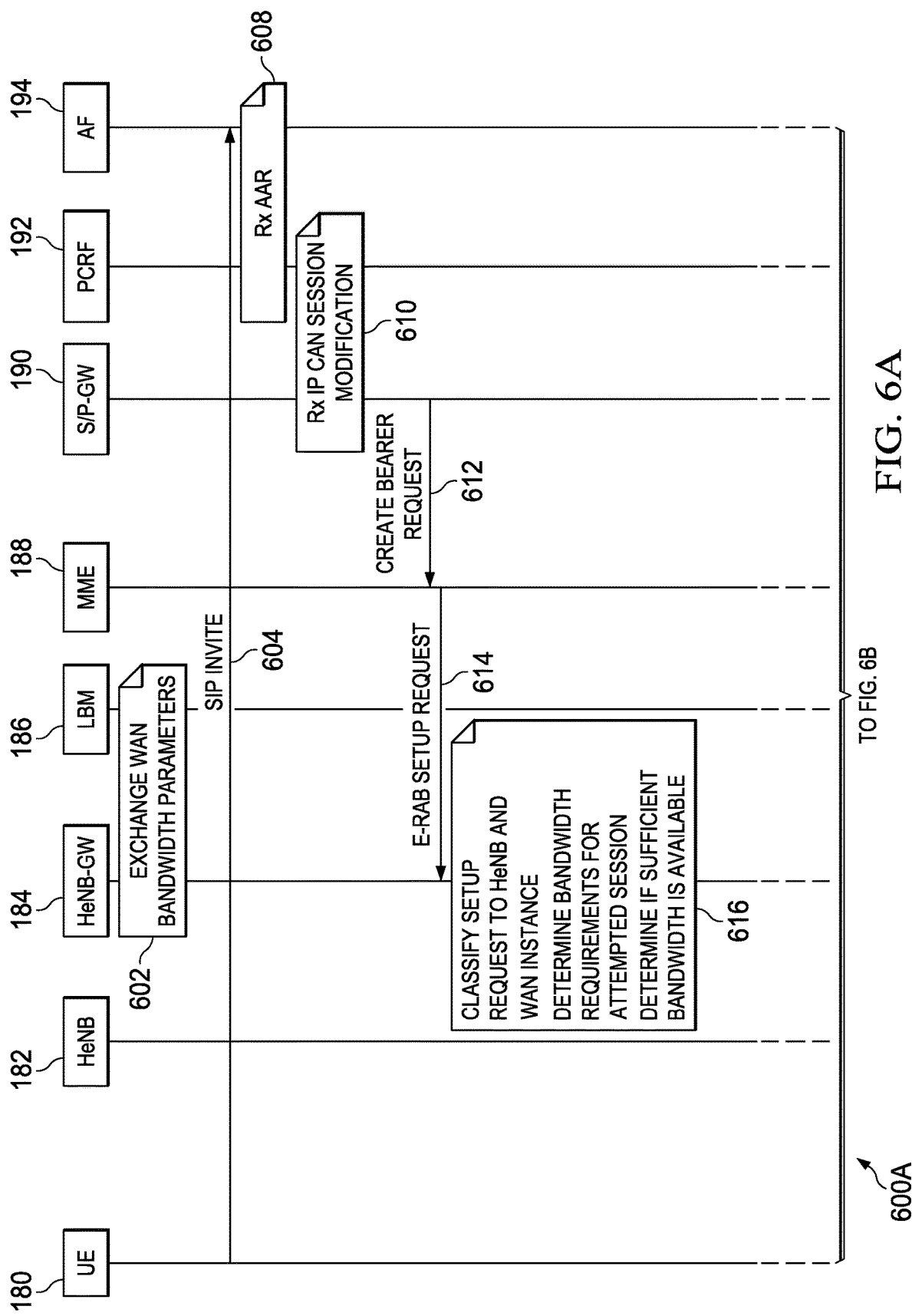
FIGS. 6A-6B are simplified interaction diagrams illustrating various signaling exchanges and operations that can be associated with providing dynamic bandwidth allocation over a WAN instance in accordance with one potential embodiment.
Figure 6B:
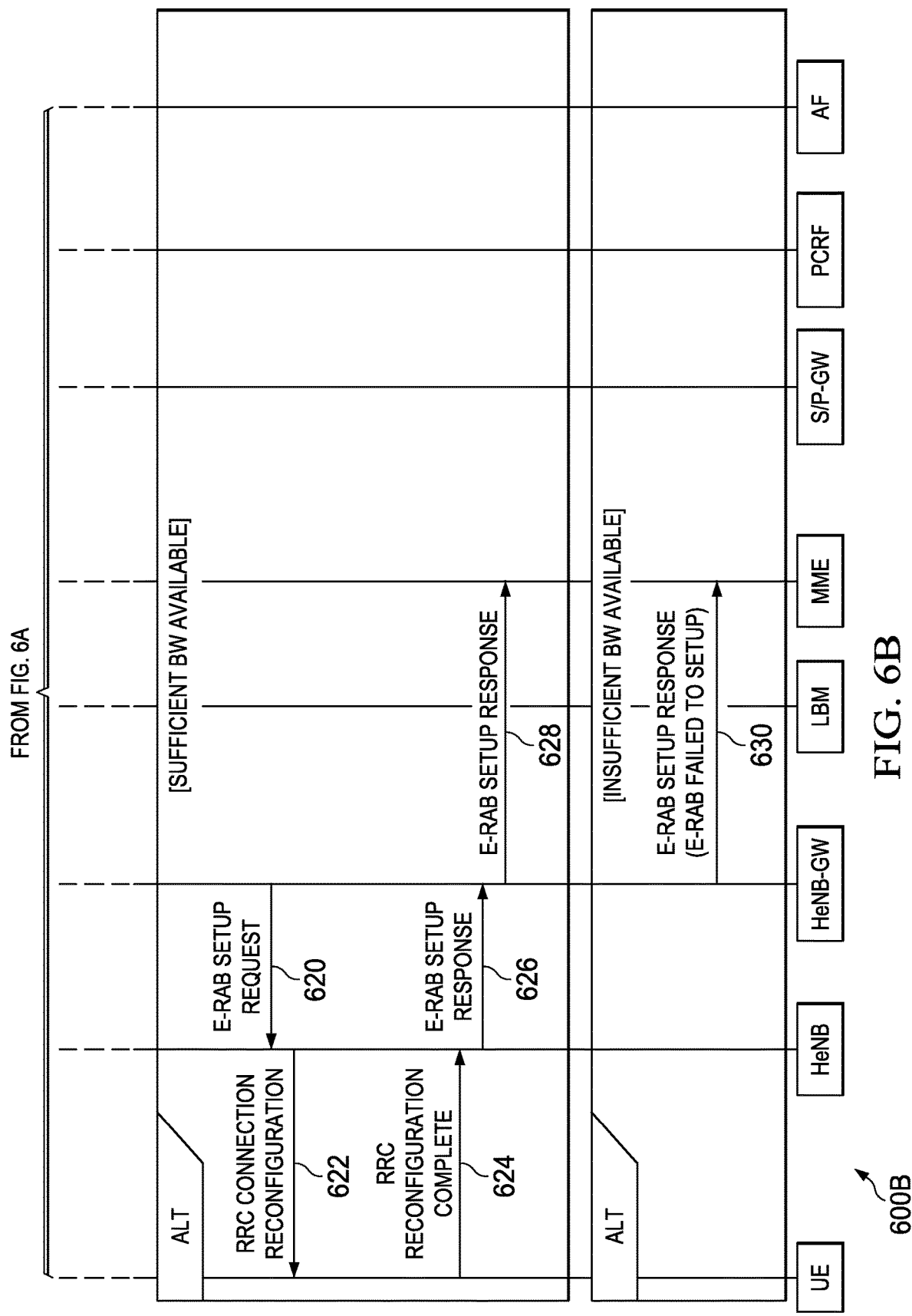

Turning to FIGS. 6A-6B, FIGS. 6A-6B are simplified interaction diagrams 600A-600B illustrating various signaling exchanges and operations that can be associated with providing dynamic bandwidth allocation over a WAN instance for a non-virtualized 4G RAN architecture in accordance with one potential embodiment. The embodiment shown in FIGS. 6A-6B can be assumed to operate in an architecture in which multiple WAN instances are configured. The embodiment shown in FIGS. 6A-6B includes a UE 180, an HeNB 182, an HeNB-GW 184, an LBM 186, an MME 188, an S/P-GW 190, a PCRF 190 and an Application Function (AF) 194. It is assumed for the embodiment shown in FIGS. 6A-6B that HeNB-GW 184 is configured with a PCEF and an LBM-IWF and LBM 186 is configured with an LBM-IWF to enable signaling exchanges between these network elements.

In general, the MME is the primary control element for the EPS core. Among other things, the MME can provide for UE tracking and paging procedures including, for example, retransmissions, tracking area list management, idle mode UE tracking, etc. For example, the MME can maintain tracking information for UE regarding previous and current information for UE transitions between or within RANs. In traditional 3GPP EPS core architectures, Serving Gateways (SGWs) are data plane elements that can route and forward user data packets, while also acting as a mobility anchor for the user plane during inter-eNodeB handovers and as an anchor for mobility between LTE and other 3GPP technologies and a Packet Data Network (PDN) Gateways (PGW) may provide UE IP connectivity access network (IP-CAN) session connectivity to external packet data networks (PDNs), such as, for example, Internet. The PGW can also serve as policy enforcement point to manage Quality of Service (QoS), online/offline flow-based charging, data generation, deep-packet inspection and intercept. In some embodiments, as shown in FIGS. 6A-6B, an SGW and PGW can be combined into a S/P-GW to provide combined SGW and PGW operations. In one embodiment, AF 194 can be configured to describe applications and/or services to PCRF 624 that may require dynamic policy and/or charging control for one or more UE. The dynamic policy and/or charging controls may include, but not be limited to, controlling the detection for service data flows, setting charging instructions for service data flows, setting QoS levels for service data flows and/or gating.

Before describing features of the embodiment shown in FIGS. 6A-6B, it should be noted that the embodiment shown in FIGS. 6A-6B covers a simplified example case in which a session request is either permitted or denied. It should be understood that other signaling exchanges could be performed in cases in which a session request can allocated to a Best Effort queue, held in a wait state or re-routed, as discussed for various embodiments described herein.

At 602, HeNB-GW 184 and LBM 186 exchange WAN bandwidth parameters for the WAN instances. At 604, UE 512 initiates a Session Initiation Protocol (SIP) invite towards AF 194 in an attempt to establish a session. At 608, a DIAMETER-based Rx Authorization and Authentication Request (AAR) signaling exchange can be performed between PCRF 192 and AF 194 to authorize and authenticate the user associated with the UE for session initiation. At 610, an Rx IP Connectivity Access Network (IP-CAN) session modification signaling exchange can be performed between S/P-GW 190 and PCRF 192, which can lead to a create bearer request being communicated to MME 188 at 612. At 614, MME 188 communicates an E-UTRAN Radio Access Bearer (E-RAB) setup request toward HeNB 182, which is intercepted by HeNB-GW 184. At 616, HeNB-GW 184 classifies the setup request to a corresponding HeNB (e.g., HeNB 182) to which the setup request is destined and classifies the HeNB to a particular WAN instance based on configuration (e.g., mapping) information provided to HeNB-GW 184 from a small cell management system that can identify an association of the HeNB 182 to the corresponding particular WAN instance based on the location the HeNB 182. Further at 616, HeNB-GW 184 determines bandwidth requirements from the setup request for the attempted session that is sought to be established by classifying the attempted session to a particular priority queue based on a session type of the attempted session. Further at 616, HeNB-GW 184 determines if there is sufficient bandwidth available for traffic for the session for the priority queue for WAN instance. The determination at 616 can be performed as described herein by calculating an instantaneous aggregated load and an instantaneous aggregate available bandwidth for the particular priority queue associated with the attempted session.

If sufficient bandwidth (BW) for the priority queue for the particular WAN instance is available within the particular WAN instances for the priority queue, HeNB-GW 184 can send the E-RAB setup request to HeNB 182 at 620. HeNB 182 can translate the setup request into a Radio Resource Control (RRC) connection reconfiguration message and can communicate the message to UE 180 at 622. UE 180 can respond with an RRC reconfiguration complete message at 624 and HeNB 182 can respond to HeNB-GW 184 with an E-RAB setup response at 626. At 628, HeNB-GW 184 can communicate the E-RAB setup response to MME 188 indicating a successful setup of the session.

However, if sufficient BW is not available for the priority queue for the particular WAN instance, then HeNB-GW 184 can send an E-RAB setup response to MME 188 at 630 indicting that the session failed to be set up.

Figure 7:
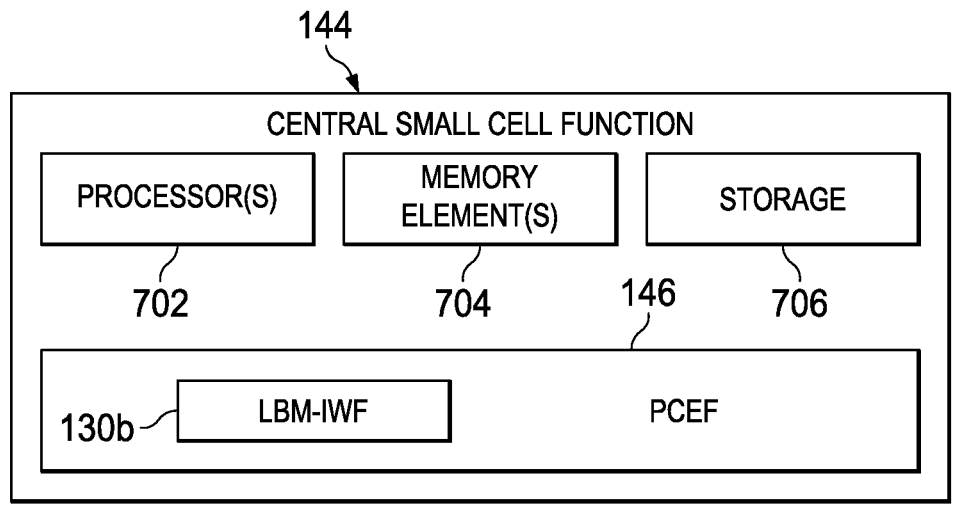
FIG. 7 is a simplified block diagram illustrating example details associated with an example central small cell function in accordance with one potential embodiment.

Turning to FIG. 7, FIG. 7 is a simplified block diagram illustrating example details associated with central small cell function 144 in accordance with one potential embodiment. Central small cell function 144 can be used in combination with enterprise deployments as shown in FIG. 1. As illustrated in the embodiment shown in FIG. 7, central small cell function 144 can in one embodiments include one or more processor(s) 702, one or more memory element(s) 704, storage 706, and PCEF 146 including LBM-IWF 130b. In at least one embodiment, processor(s) 702 is/are a hardware processor(s) configured to execute various tasks, operations and/or functions of central small cell function 144 as described herein and memory element(s) 704 is/are configured to store data associated with central small cell function 144. PCEF 146 and LBM-IWF 130b can be configured to perform various operations as discussed herein related to calculating an instantaneous aggregated load for a small cell network and/or one or more particular priority queues, determining an instantaneous available bandwidth for the network and/or one or more particular priority queues, small cell radio signaling, SCMS signaling, PCRF signaling, providing call admission control, QoS management, combinations thereof or the like. In various embodiments, storage 706 can be configured to store information associated with various operations as described herein (e.g., bandwidth parameters, threshold(s), queue and session type requirements, configuration information, UE/subscriber information, flow or session policy and/or charging information, etc.).

Figure 8:
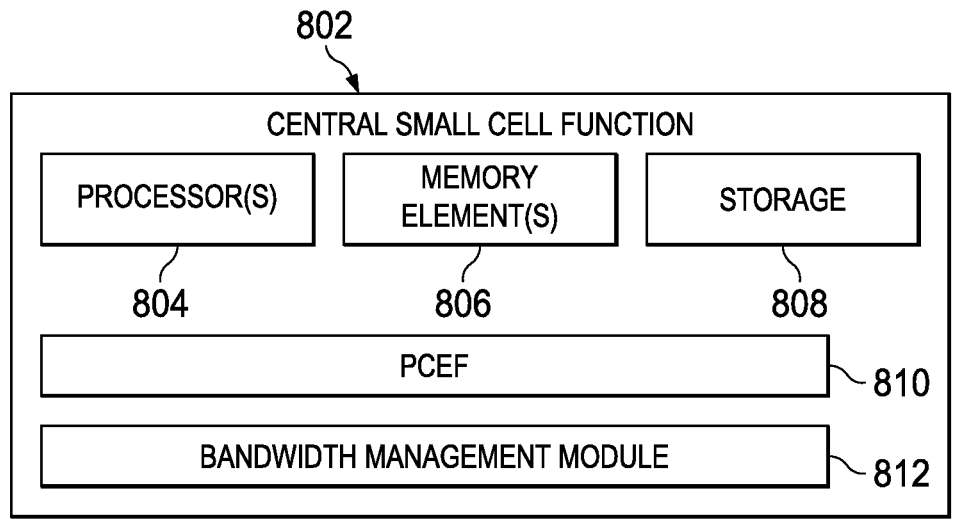
FIG. 8 is a simplified block diagram illustrating example details associated with another example central small cell function in accordance with one potential embodiment.

Turning to FIG. 8, FIG. 8 is a simplified block diagram illustrating example details associated with a central small cell function 802 in accordance with one potential embodiment. In some embodiments, as discussed herein, the QoS management features of the solution provided by communication system 100 can be used in a standalone configuration to manage voice and video bandwidth allocations within the small cell network, which may or may not overlap with an enterprise WAN, depending on deployment environment. In at least one embodiment, standalone QoS management features could find applicability where QCIs across a RAN (e.g., the small cell network) can be declared by a PCRF within a service provider network (e.g., PCRF 150 within service provider network 140). In at least one embodiment, for an enterprise deployment, for example, the standalone QoS management features could be used to ensure that the required RAN QoS could be matched by circuits in a WAN, for example, in concert with the PCRF. In another embodiment, for example, for a non-enterprise development, the standalone solution provided by incorporating a PCEF into a central small cell function could be used to generically manage bandwidth allocations in a cellular deployment system.

The embodiment shown in FIG. 8 illustrates central small cell function 802 configured to operate in a standalone configuration. Central small cell function 802 can, in one more embodiments, include one or more processor(s) 804, one or more memory element(s) 806, storage 808, a PCEF 810 and a bandwidth management module 812. In at least one embodiment, processor(s) 804 is/are a hardware processor(s) configured to execute various tasks, operations and/or functions of central small cell function 802 as described herein and memory element(s) 806 is/are configured to store data associated with central small cell function 802. In various embodiments, storage 808 can be configured to store information associated with various operations as described herein (e.g., bandwidth parameters, threshold(s), queue and session type requirements, configuration information, UE/subscriber information, flow or session policy and/or charging information, etc.).

In at least one embodiment, PCEF 810 can be configured to perform various operations policy and/or charging enforcement operations, similar to that as described for PCEF 146 of FIG. 1; however, PCEF 810 may provide for central small cell function 802 being capable of operating in a standalone configuration without interfacing with a UCM/LBM. Further, PCEF 810 and bandwidth management module 812 can be configured in various embodiments to perform operations associated with, but not limited to, calculating an instantaneous aggregated load for a small cell network, determining an instantaneous available bandwidth for the network, small cell radio signaling, SCMS signaling, PCRF signaling, providing call admission control, QoS management, combinations thereof or the like. In various embodiments, PCEF 810 and bandwidth management module 812 can perform overlapping operations to provide QoS management, bandwidth management, and/or call control for one or more small cell radios of a small cell network.

Figure 9:
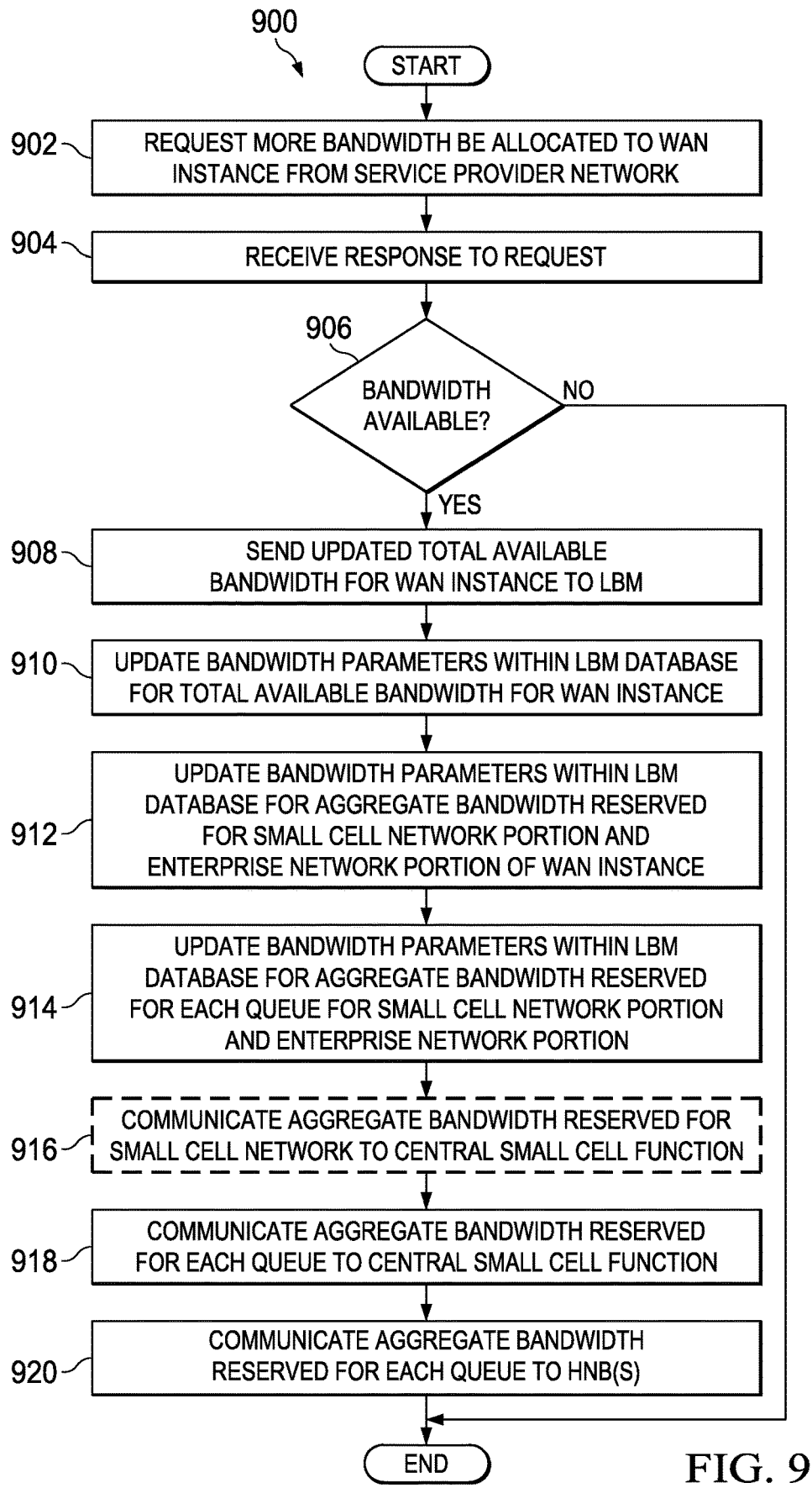
FIG. 9 is a simplified flow diagram illustrating example operations that can be associated with bandwidth remediation operations for a WAN instance in accordance with one potential embodiment.

Turning to FIG. 9, FIG. 9 is a simplified flow diagram illustrating example operations 900 that can be associated with bandwidth remediation operations for a given WAN instance in accordance with one potential embodiment. In particular, operations 900 can be associated with bandwidth remediation operations for an enterprise deployment in which a central small cell function (e.g., central small cell function 144) can request more bandwidth for the WAN instance from another element within a service provider network, such as, for example from a small cell management system (e.g., SCMS 156 within service provider network 140). In some embodiments, for example, if a decision is made by a given small cell radio to deny a session setup request or hold to the request, then the decision can be communication to the central small cell function, which can perform one or more mediation operations in an attempt to relieve bandwidth exhaustion for a particular priority queue. However, in other embodiments, the decision can be made by the central small cell function alone (e.g., if the central small cell function intercepts the setup request), in which case no communication from HNBs may be needed. For the embodiment shown in FIG. 9, operations 900 assume that the central small cell function has been made aware that a call setup up request for a particular priority queue has been denied or is being held in wait for a period of time.

At 902, the central small cell function 144 requests more bandwidth be allocated to the WAN instance from the service provider network (e.g., from the SCMS within the service provider network). At 904, the central small cell function receives an indication from service provider network (e.g., from the SCMS) regarding whether bandwidth is available. If bandwidth is available, then in certain embodiments the response can include an indication of the additional bandwidth for the one or more WAN instances. At 906, the central small cell function 144 determines, based on the response, whether additional bandwidth is available for the WAN instance. If additional bandwidth is not available, then the operations can end. However, if additional bandwidth is available, then operations can continue to 908 in which the central small cell function 144 generates, via LBM-IWF 130*b*, one or more messages to communicate the updated total available bandwidth for the one or more WAN instances to LBM 128 via LBM-IWF 130*a*.

At 910, LBM 128 updates the bandwidth parameters within LBM database 132 for the total available bandwidth for the WAN instance. At 912, LBM 128 updates the bandwidth parameters within LBM database 132 for the aggregate bandwidth reserved for the small cell network portion and the enterprise network portion of the WAN instance. At 914, LBM 128 updates the bandwidth parameters within LBM database 132 for the aggregate bandwidth reserved for each queue (e.g., each priority queue and a Best Effort queue, if configured) for the small cell network portion and the enterprise network portion of the WAN instance. At 918, LBM 128 communicates, via LBM-IWF 130*a*, the aggregate bandwidth reserved for each queue (e.g., priority queue and Best Effort queue, if configured) to the central small cell function 144 (e.g., PCEF 146/LBM-IWF 130*b*) for the central small cell function to update associated bandwidth parameters maintained by the central small cell function. In some embodiments, as shown at 916, LBM 128 communicates, via LBM-IWF 130*a*, the aggregate bandwidth reserved for the small cell network to central small cell function 144 (e.g., PCEF 146/LBM-IWF 130*b*) for the central small cell function 144 to update associated bandwidth parameters maintained by the central small cell function. At 920, the central small cell function 144 communicates (e.g., via a proprietary HNBAP/S1 signaling) the aggregate bandwidth reserved for each queue to HNBs 114*a*-114*b* for the HNBs to update bandwidth parameters maintained by the HNBs.

Figure 10:
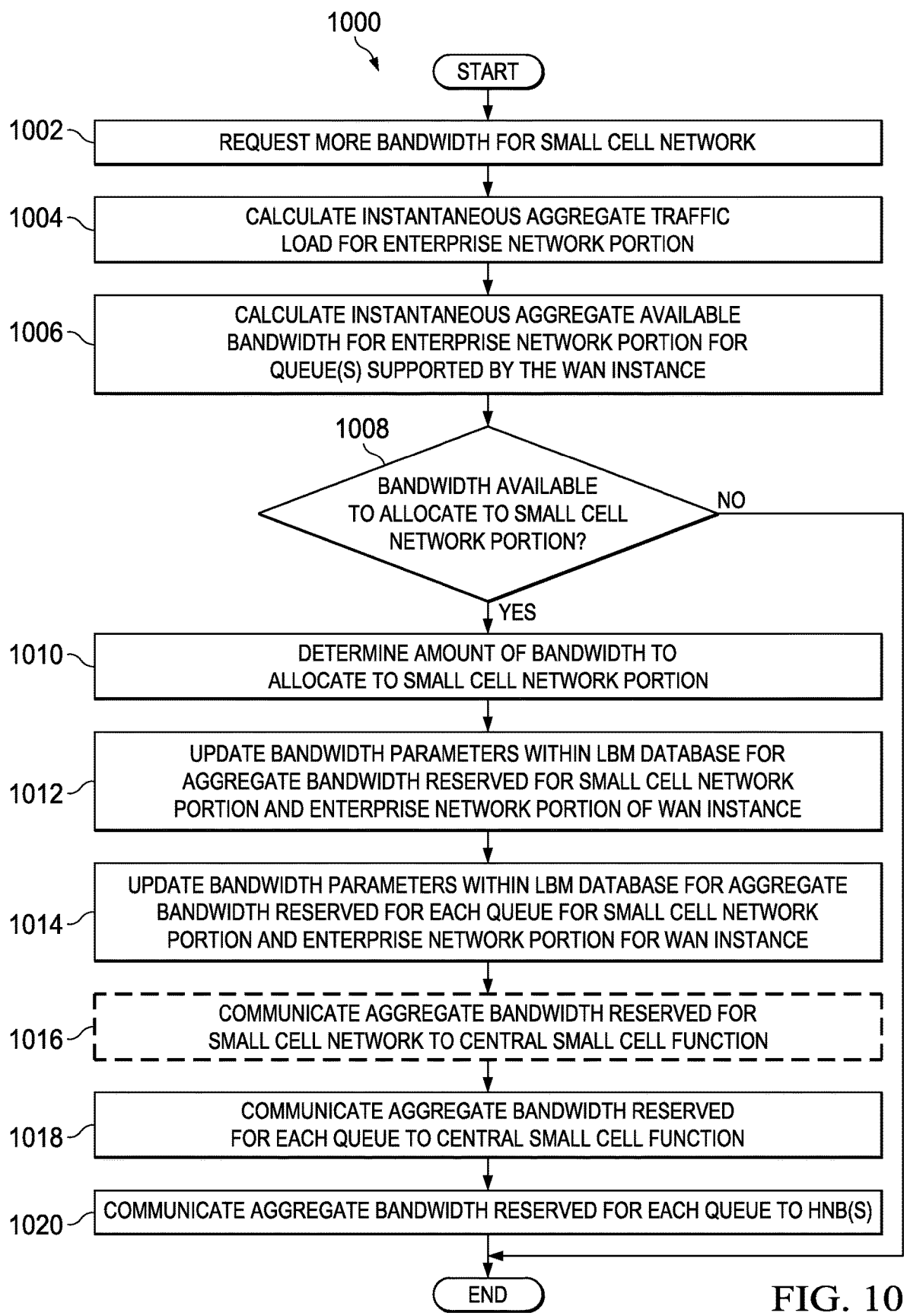
FIG. 10 is a simplified flow diagram illustrating other example operations that can be associated with bandwidth remediation operations for a WAN instance in accordance with one potential embodiment.

Turning to FIG. 10, FIG. 10 is a simplified flow diagram illustrating other example operations 1000 that can be associated with bandwidth remediation operations a given WAN instance in accordance with one potential embodiment. In particular, operations 1000 can be associated with bandwidth remediation operations in which central small cell function 144 requests, via LBM-IWF 130*b*, more bandwidth for the small cell network 116 from LBM 128 via LBM-IWF 130*a*. In some embodiments, for example, if the decision to deny a setup request or hold the request is made by a given small cell radio, then the decision can be communicated to central small cell function 144, which can perform one or more remediation operations in an attempt to relieve bandwidth exhaustion for a particular priority queue. However, in other embodiments, the decision can be made by central small cell function 144 alone, in which case no communication from the small cell radios may be needed. For the embodiment shown in FIG. 10, operations 1000 assume that central small cell function 144 has been made aware that a setup request for a particular priority queue has been denied or is being held in wait for a period of time.

At 1002, central small cell function 144 requests, via a signaling exchange between LBM-IWF 130*b* and LBM-IWF 130*a*, LBM 128 to allocate more bandwidth to the small cell network 116 portion of the WAN instance. In various embodiments, the request can include one or more messages generated by central small cell function 144 via LBM-IWF 130*b* including one or more of: an indication that more bandwidth is needed, an indication of an amount of bandwidth that is needed, an indication of an amount of bandwidth that is needed for a particular priority queue, combinations thereof or the like.

Upon receiving the request via LBM-IWF 130*a* at 1004, LBM 128 calculates an instantaneous aggregated traffic load among the different locations for the enterprise network portion of the WAN instance. As PBX 126 and LBM 128 can manage bandwidth for the WAN instance, bandwidth related information for the enterprise network portion can be made readily available to LBM 128. In at least one embodiment, the calculating at LBM 128 can include calculating an instantaneous aggregate traffic load among different locations for the enterprise network portion for each queue (e.g., each priority queue and a Best Effort queue, if configured) of the WAN instance. At 1006, LBM 128 calculates an instantaneous aggregate available bandwidth for the enterprise network portion for each queue of the WAN instance. At 1008, LBM 128 determines whether bandwidth is available to allocate to the small cell network portion.

In various embodiments, the determination at 1008 can be based on a threshold level of bandwidth buffer that is desired to be maintained for each queue such that if traffic for a particular queue has available bandwidth greater than the threshold level, then the excess bandwidth for the enterprise network portion can be allocated to the small cell network portion. The threshold level technique is only one example technique that LBM 128 might perform to determine whether bandwidth is available to re-allocate to the small cell network portion for the WAN instance. It should be understood that any other technique, threshold based or otherwise, can be used within the scope of the teachings of the present disclosure to determine whether bandwidth may be available to allocate to a small cell network.

If no bandwidth is available then the operations may end. However, if bandwidth is available to allocate to the small cell network portion, then operations can continue to 1010 in which LBM 128 can determine an amount of bandwidth to allocate to the small cell network portion. Similar to the techniques discussed above, any technique, threshold based or otherwise can be used to determine the amount of bandwidth to allocate to the small cell network portion. For example, in some embodiments, the amount to allocate can be specified in the request received from central small cell function 144.

Based on the determined amount, LBM 128 updates bandwidth parameters within LBM database 132 associated with the aggregate bandwidth reserved for the small cell network portion and the enterprise network portion of the WAN instance at 1012. At 1014, LBM 128 updates bandwidth parameters within LBM database 132 associated with the aggregate bandwidth reserved for each queue (e.g., priority and Best Effort, if configured) for the small cell network portion and the enterprise network portion of the WAN instance. At 1018, LBM 128, via LBM-IWF 130*a*, communicates the aggregate bandwidth reserved for each priority queue to central small cell function 144, via LBM-IWF 130*b* for the central small cell function to update associated bandwidth parameters maintained by the central small cell function. In some embodiments, as shown at 1016, LBM 128, via LBM-IWF 130*a*, communicates the aggregate bandwidth reserved for the small cell network to central small cell function 144, via LBM-IWF 130*b*, for the central small cell function 144 to update associated bandwidth parameters maintained by the central small cell function. At 1020, central small cell function 144 communicates (e.g., via proprietary HNBAP/S1 signaling) the aggregate bandwidth reserved for each queue to HNBs 114*a*-114*b*.

Figure 11:
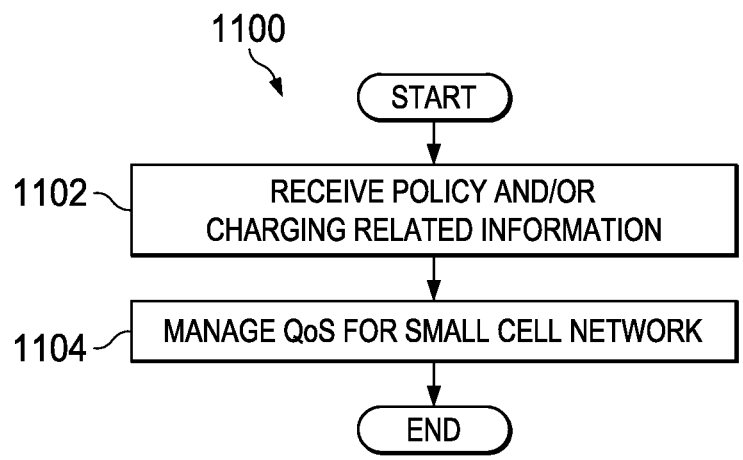
FIG. 11 is a simplified flow diagram illustrating yet other example operations that can be associated with bandwidth remediation operations for a WAN instance in accordance with one potential embodiment.

Turning to FIG. 11, FIG. 11 is a simplified flow diagram illustrating yet other example operations 1100 that can be associated with bandwidth remediation operations for a given WAN instance in accordance with one potential embodiment. In particular, operations 1100 can be associated with bandwidth remediation operations in which central small cell function 144 manages QoS for the small cell network portion of the WAN instance in an effort to relieve bandwidth exhaustion for one or more priority queues. For the embodiment shown in FIG. 11, operations 1100 assume that central small cell function 144 has been made aware that a setup request for a particular priority queue has been denied or is being held in wait for a period of time.

At 1102, central small cell function 144 can receive policy and/or charging related information for one or more previously established sessions or for one or more currently attempted sessions for which setup requests have been intercepted. In various embodiments, central small cell function 144 can receive the policy and/or charging related information via a query to PCRF 150 and/or LBM 128 (e.g., via an LBM-IWF signaling exchange) or either of these network elements can broadcast such information. At 1104, central small cell function 144 can manage QoS for one or more previously established sessions or for one or more currently attempted sessions for which setup requests have been intercepted to relieve bandwidth exhaustion for the small cell network portion of the WAN instance. The operations can then end.

In some embodiments, managing QoS can include negotiating the QoS associated with current attempted sessions for which setup request have been intercepted. In other embodiments, managing QoS can include modifying QoS levels associated with one or more previously established sessions. In one embodiment, managing QoS (whether through negotiations or modifications) can include adjusting a particular QoS to prioritize circuit switched (CS) traffic over packet switched (PS) data traffic. In still one embodiment, managing QoS can include adjusting a particular QoS level to prioritize VoIP PS traffic over PS data traffic. In still one embodiment, managing QoS can include adjusting a particular QoS level for one or more radio access bearers (RABs) to adjust priority between sessions (previously established or currently attempting to be established) within the small cell network portion.

Figure 12:
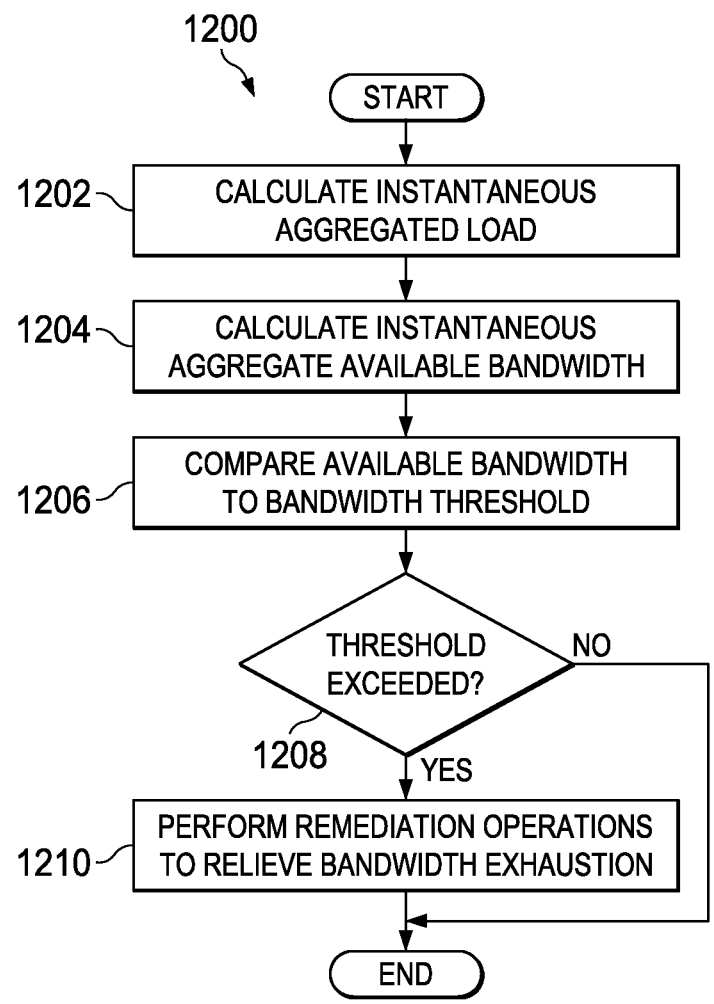
FIG. 12 is a simplified flow diagram illustrating example operations that can be associated with bandwidth management in accordance with one potential embodiment.

Turning to FIG. 12, FIG. 12 is a simplified flow diagram illustrating example operations 1200 that can be associated with standalone bandwidth management operations that can be performed by a central small cell function (e.g., central small cell function 144 or central small cell function 802) in accordance with one potential embodiment. As discussed herein, a central small cell function can perform standalone bandwidth management operations, QoS management operations, call control operations, etc. for non-enterprise and enterprise deployments. The embodiment shown in FIG. 12 illustrates example operations 1200 that can be performed by central small cell function 802 configured to operate in a standalone configuration for non-enterprise and/or enterprise deployments.

At any time, when operating in a standalone configuration, central small cell function 802 can provide bandwidth management, call control, QoS management, etc. for a given small cell network. In some embodiments, central small cell function 802 can perform operations 1200 each time a setup request is intercepted for an attempted session. In some embodiments, central small cell function 802 can perform operations 1200 periodically to ensure efficient use of small cell network bandwidth. In some embodiments, central small cell function 802 can perform operations 1200 upon being tasked by another network element (e.g., an LBM for an enterprise deployment, a small cell management system, a PCRF, etc.).

Thus, operations can begin at 1202 in which central small cell function 802 calculates an instantaneous aggregated traffic load for one or more small cell radios (e.g., HNBs 114a-114b, HeNBs or any combination of VNFs/PNFs) for a small cell deployment. In one embodiment, for a non-enterprise deployment, for example, central small cell function 802 can calculate the instantaneous aggregated load by summing load information signaled to central small cell function 802 from small cell radios within the small cell network. In another embodiment, for an enterprise deployment, the calculating at 1202 can include central small cell function 802 calculating the aggregated load across a plurality of queues for a small cell network portion of an enterprise WAN instance.

At 1204, the central small cell function 802 calculates an instantaneous aggregate available bandwidth for the small cell network. In one embodiment, for a non-enterprise deployment, for example, it can be assumed that central small cell function 802 is configured with bandwidth parameters for the small cell network, such as, for example, an amount of aggregate bandwidth reserved for the small cell network. In such an embodiment, operations 1204 can include subtracting the instantaneous aggregated load calculated at 1204 from the aggregate bandwidth reserved for the small cell network. In another embodiment, for an enterprise deployment, for example, it can be assumed that central small cell function 802 is configured with and/or made aware of bandwidth parameters, such as, for example, an amount of aggregate bandwidth reserved for one or more queues (e.g., priority and Best Effort, if configured) for the enterprise WAN instance. In such an embodiment, the calculating at 1204 can include subtracting the instantaneous aggregated load for a particular queue from the aggregate bandwidth reserved for the particular queue for each of the one or more queues for the WAN instance.

At 1206, the central small cell function 802 can compare the available bandwidth to a bandwidth threshold. In various embodiments, the bandwidth threshold can represent an amount of bandwidth buffer which a network operator, service provider, etc. seeks to maintain for the small cell network. In one embodiment, for a non-enterprise deployment, for example, it can be assumed that central small cell function 802 is configured with and/or made aware of bandwidth parameters, such as, for example, a bandwidth threshold for the small cell network. In another embodiment, for an enterprise deployment, for example, it can be assumed that central small cell function 802 is configured with and/or made aware of bandwidth parameters such as, for example, a bandwidth threshold for one or more queues for the enterprise WAN instance.

At 1208, the central small cell function 802 determines if the bandwidth threshold is exceeded. If the bandwidth threshold is not exceeded, the operations can end. However, if the central small cell function determines at 1208 that the bandwidth threshold is exceeded, the operations can continue to 1210 in which the central small cell function can perform one or more bandwidth remediation operations in an effort to relieve bandwidth exhaustion for the small cell network. In various embodiments, remediation operations can include requesting more bandwidth for the small cell network (e.g., either from an LBM and/or from the service provider network) and/or QoS management operations as discussed for the various embodiments described herein and the operations can end.

Figure 13A:
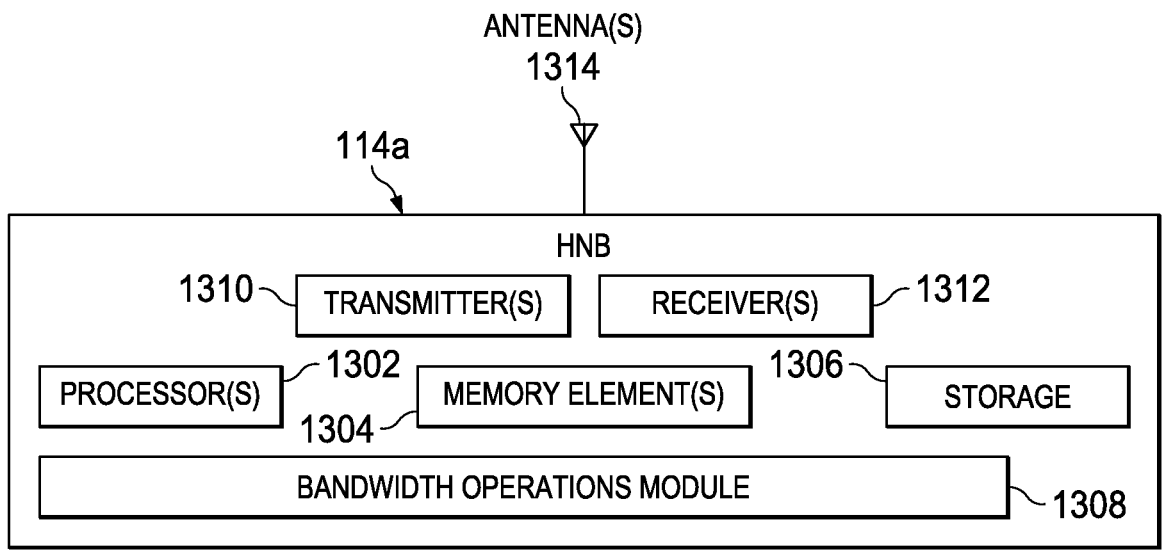
FIGS. 13A-13C are simplified block diagrams illustrating example details associated with various potential embodiments.
Figure 13B:
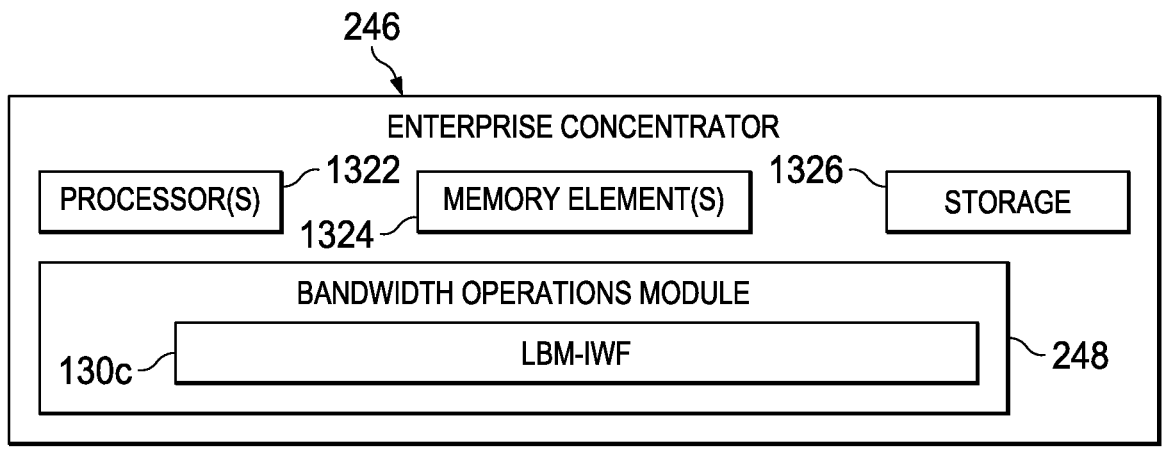
Figure 13C:
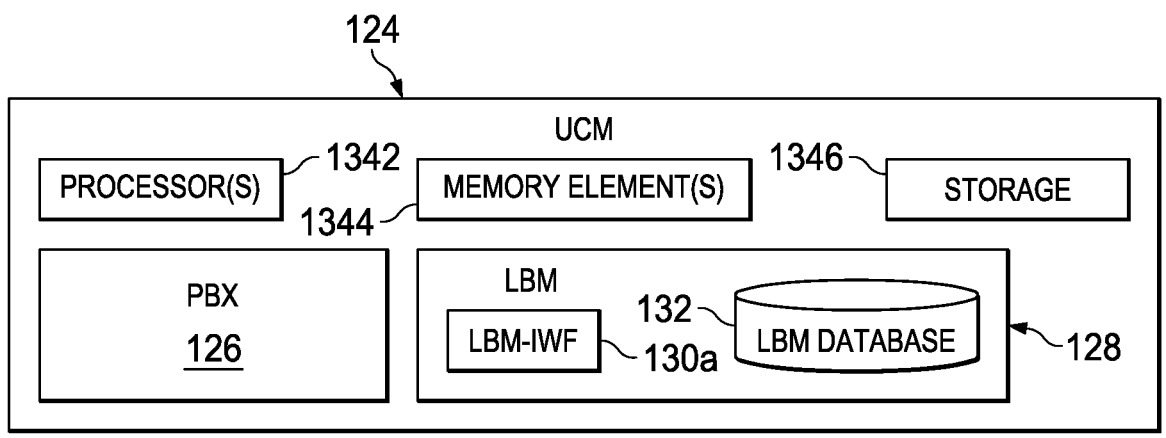

Turning to FIGS. 13A-13C, FIGS. 13A-13C are simplified block diagrams illustrating example details associated with various potential embodiments. Referring to FIG. 13A, FIG. 13A is a simplified block diagram illustrating example details that can be associated with HNB 114a in accordance with one potential embodiment. It should be understood that features of HNB 114a can be configured for any small cell radio in communication system 100, including HNB 114b any HeNB or any combination of VNFs/PNFs for a vRAN architecture. As shown in FIG. 13A, HNB 114a can, in one or more embodiments, include one or more processor(s) 1202, one or more memory element(s) 1304, storage 1306, a bandwidth operations module 1308, one or more transmitter(s) 1310, one or more receiver(s) 1312 and one or more antenna(s) 1314.

In at least one embodiment, processor(s) 1302 is/are a hardware processor(s) configured to execute various tasks, operations and/or functions of HNB 114a as described herein and memory element(s) 1304 is/are configured to store data associated with HNB 114a. In various embodiments, storage 1306 can be configured to store information associated with various operations as described herein (e.g., bandwidth parameters, threshold(s), configuration information, UE/subscriber information, queue and session type requirements, flow or session policy and/or charging information, etc.). In various embodiments, transmitter(s) 1310 can be associated with downlink data that may be transmitted to one or more UE (e.g., any of UE 112a-112c) via antenna(s) 1314 and receiver(s) 1312 can be associated with uplink data that may be received from one or more UE via antenna(s) 1314.

Bandwidth operations module 1308 can be configured in various embodiments to perform operations associated with, but not limited to, calculating an instantaneous aggregated load for a small cell network and/or one or more particular priority queues, determining an instantaneous available bandwidth for the network and/or one or more particular priority queues, central small cell function signaling (e.g., PCEF/LBM-IWF signaling), UCM signaling, LBM/LBM-IWF signaling, providing call admission control, combinations thereof or the like.

Referring to FIG. 13B, FIG. 13B is a simplified block diagram illustrating example details that can be associated with enterprise concentrator 246 in accordance with one potential embodiment. As shown in FIG. 13B, enterprise controller 1320 can, in one or more embodiments, include one or more processor(s) 1322, one or more memory element(s) 1324, storage 1326, bandwidth operations module 248 and LBM-IWF 130c.

In at least one embodiment, processor(s) 1322 is/are a hardware processor(s) configured to execute various tasks, operations and/or functions of enterprise concentrator 248 as described herein and memory element(s) 1324 is/are configured to store data associated with enterprise concentrator 246. In various embodiments, storage 1326 can be configured to store information associated with various operations as described herein (e.g., bandwidth parameters, threshold(s), queue and session type requirements, configuration information, UE/subscriber information, flow or session policy and/or charging information, etc.).

Bandwidth operations module 248 and LBM-IWF 130c can be configured in various embodiments to perform operations associated with, but not limited to, calculating an instantaneous aggregated load for a small cell network and/or one or more particular priority queues, determining an instantaneous available bandwidth for a network and/or one or more queues, central small cell function signaling (e.g., PCEF/LBM-IWF signaling), SecGW signaling, UCM signaling (e.g., LBM/LBM-IWF signaling), combinations thereof or the like.

Referring to FIG. 13C, FIG. 13C is a simplified block diagram illustrating example details that can be associated with UCM 124 in accordance with one potential embodiment. As shown in FIG. 13C, UCM 124 can, in one or more embodiments, include one or more processor(s) 1342, one or more memory element(s) 1344, storage 1346, PBX 126 and LBM 128 including LBM-IWF 130a and LBM database 132.

In at least one embodiment, processor(s) 1342 is/are a hardware processor(s) configured to execute various tasks, operations and/or functions of UCM 124 as described herein and memory element(s) 1344 is/are configured to store data associated with UCM 124. In various embodiments, storage 1346 can be configured to store information associated with various operations. PBX 126 can be configured to perform various operations associated with calls for the enterprise network portion of a WAN instance. In various embodiments, LBM 128 including LBM-IWF 130a and LBM database 132 can be configured to perform various operations as described herein for a WAN instance associated with, but not limited to, calculating an instantaneous aggregated load for a small cell network and/or one or more particular priority queues, determining an instantaneous available bandwidth for a network and/or one or more queues, central small cell function signaling (e.g., PCEF/LBM-IWF signaling), UCM signaling, LBM/LBM-IWF signaling, providing call admission control, combinations thereof or the like. In various embodiments, LBM database 132 can be configured to store information associated with various operations as described herein (e.g., bandwidth parameters, threshold(s), queue and session type requirements, configuration information, UE/subscriber information, etc.).

In regards to the internal structure associated with FIG. 1, each of UE 112a-112c, other HNB 114b, enterprise communication devices 122a-122e, secGW 142, SGSN 148, PCRF 150, MSC 152, GGSN 154 and SCMS 156 as well as HNB-GW 222, HeNB-GW 232, HeNBs 234a-234b, H(e)NB-GW 242 and H(e)NBs 244a-244b associated with FIG. 2B and UE 180, HeNB 182, HeNB-GW 184, LBM 186, MME 188, S/P-GW 190, PCRF 192 and AF 194 associated with FIGS. 6A-6B may each also include a respective at least one processor, a respective at least one memory element and/or a respective storage. Hence, appropriate software, hardware and/or algorithms are being provisioned in UE 112a-112e, HNB 114a-114b, enterprise communication devices 122a-122e, UCM 124, central small cell function 144, central small cell function 802 (as shown in FIG. 8), enterprise concentrator (as shown in FIG. 2B), secGW 142, SGSN 148, PCRF 150, MSC 152, GGSN 154 and SCMS as well as HNB-GW 222, HeNB-GW 232, HeNBs 234a-234b, H(e)NB-GW 242, H(e)NBs 244a-244b, UE 180, HeNB 182, HeNB-GW 184, LBM 186, MME 188, S/P-GW 190, PCRF 192 and AF 194 in order to facilitate dynamic bandwidth allocation operations in a network environment. Further, in at least one embodiments, appropriate software, hardware and/or algorithms are being provisioned for small cell VNF 252 including PCEF VNFC 256 and LBM-IWF VNFC 258, small cell PNFs 254a-254b, small cell VNF 262 including PCEF VNFC 266 and LBM-IWF VNFC 268, radio aggregator VNF 270, bandwidth operations VNFC 272 including LBM-IWF VNFC 274 and small cell PNFs 264a-264b, any of which can be realized for a virtualized RAN deployment that can operate via one or more servers, data centers, etc. in a hypervisor based and/or container based virtualization. Note that in certain examples, certain storage (e.g., for storing information associated with operations described herein in one or more databases, etc.) can be consolidated memory elements (or vice versa), or the storage can overlap/exist in any other suitable manner.

In one example implementation, each of UE 112a-112c, other HNB 114b, enterprise communication devices 122a-122e, secGW 142, SGSN 148, PCRF 150, MSC 152, GGSN 154 and SCMS 156 as well as HNB-GW 222, HeNB-GW 232, HeNBs 234a-234b, H(e)NB-GW 242 and H(e)NBs 244a-244b associated with FIG. 2B and UE 180, HeNB 182, HeNB-GW 184, LBM 186, MME 188, S/P-GW 190, PCRF 192 and AF 194 associated with FIGS. 6A-6B may each also include a respective at least one processor, a respective at least one memory element and/or a respective storage. Hence, appropriate software, hardware and/or algorithms are being provisioned in UE 112a-112e, HNB 114a-114b, enterprise communication devices 122a-122e, UCM 124, central small cell function 144, central small cell function 802 (as shown in FIG. 8), enterprise concentrator (as shown in FIG. 2B), secGW 142, SGSN 148, PCRF 150, MSC 152, GGSN 154 and SCMS as well as HNB-GW 222, HeNB-GW 232, HeNBs 234a-234b, H(e)NB-GW 242, H(e)NBs 244a-244b, small cell PNFs 254a-254b, small cell PNFs 264a-264b, and UE 180, HeNB 182, HeNB-GW 184, LBM 186, MME 188, S/P-GW 190, PCRF 192 and AF 194 are physical network elements, which are meant to encompass network appliances, servers, routers, switches, gateways, bridges, loadbalancers, firewalls, processors, modules, or any other suitable device, component, element, or object, which may be operable to exchange information that facilitates or otherwise helps to facilitate dynamic bandwidth allocation operations (e.g., for networks such as those illustrated in FIGS. 1, 2A and 2B). In other embodiments, these operations and/or features may be provided external to these elements, or included in some other network device to achieve this intended functionality.

In still other embodiments, small cell VNF 252 including PCEF VNFC 256 and LBM-IWF VNFC 258, small cell VNF 262 including PCEF VNFC 266 and LBM-IWF VNFC 268, radio aggregator VNF 270 and bandwidth operations VNFC 272 including LBM-IWF VNFC 274 can perform operations as virtualized network elements operating in a hypervisor-based or a container-based (or combination thereof) environment, which are meant to encompass virtualized network appliances, servers, routers, switches, gateways, bridges, loadbalancers, firewalls, processors, modules, or any other suitable device, component, element, or object, which may be operable to exchange information that facilitates or otherwise helps to facilitate dynamic bandwidth allocation operations.

Alternatively, one or more of these elements, virtualized or non-virtualized, can include software (or reciprocating software) that can coordinate in order to achieve the operations and/or features, as outlined herein. In still other embodiments, one or more of these devices, virtualized or non-virtualized, may include any suitable algorithms, hardware, software, components, modules, interfaces, or objects that facilitate the operations thereof. This may be inclusive of appropriate algorithms and communication protocols that allow for the effective exchange of data or information.

In various embodiments, these elements, virtualized or non-virtualized, may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to these elements could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the functions as outlined herein associated with providing dynamic bandwidth allocation operations may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 13A-13C] can store data used for the operations described herein. This includes the memory elements being able to store software, logic, code, or processor instructions that are executed to carry out the activities described herein. A processor can execute any type of instructions associated with the data to achieve the operations detailed herein. In one example, a processor can include multiple processing cores, each capable of performing operations in a parallel or serial manner to carry out activities described herein. In another example, the processors [as shown in FIGS. 13A-13C] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof. Note also that a module, function, VNF and/or VNFC as referred to herein in this Specification, can be inclusive of an executable file comprising instructions that can be understood and processed on a computer, and may further include library modules loaded during execution, object files, system files, hardware logic, software logic, or any other executable modules.

Note that in this Specification, references to various features (e.g., elements, structures, modules, components, steps, operations, characteristics, etc.) included in 'one embodiment', 'one potential embodiment', 'example embodiment', 'certain embodiment', 'an embodiment', 'another embodiment', 'some embodiments', 'various embodiments', 'other embodiments', 'certain embodiments', 'alternative embodiment', and the like are intended to mean that any such features and improvements are included in one or more embodiments of the present disclosure, but may or may not necessarily be combined in the same embodiments.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges and protocols, communication system 100 may be applicable to other exchanges or routing protocols. Moreover, although communication system 100 has been illustrated with reference to particular elements and operations that facilitate various processes, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A computer-implemented method of dynamic bandwidth allocation over a wide area network (WAN) instance, the computer-implemented method comprising:
    during a transmission of a setup request for a session via a small cell network portion associated with the WAN instance, intercepting the setup request at an intercepting element of a plurality of intercepting elements of the small cell network portion, wherein the intercepting element is based on a request type of the setup request and is selected from a small cell radio element and a central small cell function element, wherein the WAN instance comprises the small cell network portion including one or more small cell radios and a central small cell function and an enterprise network portion including one or more enterprise communication devices, wherein the small cell network portion and the enterprise network portion of the WAN instance are interconnected with each other and to a service provider network;
    classifying the session to a particular WAN priority queue of a plurality of WAN priority queues configured to support different types of traffic that traverse the WAN instance, wherein each of the plurality of WAN priority queues is allocated a respective portion of a total bandwidth of the WAN instance;
    determining whether the particular WAN priority queue has available bandwidth for the session, based on a session type of the session and an aggregate available bandwidth for the particular WAN priority queue;
    upon determining that the particular WAN priority queue has no available bandwidth for the session, performing, by operation of one or more computer processors of the intercepting element, a bandwidth remediation operation that includes re-routing the session to a non-priority queue; and
    upon determining that the non-priority queue has available bandwidth for the session, permitting the session to be established.

2. The computer-implemented method of claim 1, further comprising:
    determining a bandwidth requirement for the session based on a session type associated with the session; and
    determining the aggregate available bandwidth for the particular WAN priority queue, based on an aggregate load for the particular WAN priority queue;
    wherein the aggregate load for the particular WAN priority queue is calculated via one or more signaling exchanges with the one or more small cell radios within the small cell network portion of the WAN instance, the aggregate load comprising an instantaneous aggregate load; and
    wherein the aggregate available bandwidth for the particular WAN priority queue is calculated via one or more signaling exchanges with a location bandwidth manager within the enterprise network portion of the WAN instance, the aggregate available bandwidth comprising an instantaneous aggregate available bandwidth.

3. The computer-implemented method of claim 2, wherein it is determined that the particular WAN priority queue has available bandwidth for the session after determining the instantaneous aggregate available bandwidth for the WAN priority queue is greater than or equal to the bandwidth requirement for the session.

4. The computer-implemented method of claim 2, wherein calculating the instantaneous aggregate load for the particular WAN priority queue includes calculating a sum of bandwidth previously allocated for one or more other sessions previously established or for one or more other sessions seeking being established for the particular WAN priority queue.

5. The computer-implemented method of claim 2, wherein calculating the instantaneous aggregate available bandwidth includes subtracting the instantaneous aggregate load for the particular WAN priority queue from a total bandwidth reserved for the particular WAN priority queue for the WAN instance.

6. The computer-implemented method of claim 1, wherein the session comprises a first session, wherein after determining bandwidth for the particular WAN priority queue is not available for a second session, the computer-implemented method further comprises one of:
    denying the second session from being established;
    re-routing the second session to another WAN instance after determining a plurality of WAN instances are configured for a communication network and another WAN instance has available bandwidth; and
    holding a setup request corresponding to the second session for a period of time before repeating the determining whether bandwidth for the particular WAN priority queue is available for the second session.

7. The computer-implemented method of claim 1, wherein the session comprises a first session, wherein after determining bandwidth for the particular WAN priority queue is not available for a second session, the computer-implemented method further comprises at least one of:
    managing Quality of Service (QoS) by the central small cell function for at least one of: the second session for which a second setup request was intercepted; one or more other sessions previously established for the small cell network portion; and one or more other sessions for which another setup request has been intercepted for the small cell network portion;

communicating a request to the service provider network to allocate more bandwidth for the WAN instance; and communicating a request to a location bandwidth manager within the enterprise network portion to allocate more bandwidth for the small cell network portion.

8. One or more non-transitory tangible media encoding logic that includes instructions for dynamic bandwidth allocation over a wide area network (WAN) instance, the instructions executable to perform operations comprising:

during a transmission of a setup request for a session via a small cell network portion associated with the WAN instance, intercepting the setup request at an intercepting element of a plurality of intercepting elements of the small cell network portion, wherein the intercepting element is based on a request type of the setup request and is selected from a small cell radio element and a central small cell function element, wherein the WAN instance comprises the small cell network portion including one or more small cell radios and a central small cell function and an enterprise network portion including one or more enterprise communication devices, wherein the small cell network portion and the enterprise network portion of the WAN instance are interconnected with each other and to a service provider network;

classifying the session to a particular WAN priority queue of a plurality of WAN priority queues configured to support different types of traffic that traverse the WAN instance, wherein each of the plurality of WAN priority queues is allocated a respective portion of a total bandwidth of the WAN instance;

determining whether the particular WAN priority queue has available bandwidth for the session, based on a session type of the session and an aggregate available bandwidth for the particular WAN priority queue;

upon determining that the particular WAN priority queue has no available bandwidth for the session, performing, by operation of one or more computer processors of the intercepting element when executing the instructions, a bandwidth remediation operation that includes re-routing the session to a non-priority queue; and upon determining that the non-priority queue has available bandwidth for the session, permitting the session to be established.

9. The one or more non-transitory tangible media of claim 8, wherein the operations further comprise:

determining a bandwidth requirement for the session based on a session type associated with the session; and determining the aggregate available bandwidth for the particular WAN priority queue, based on an aggregate load for the particular WAN priority queue;

wherein the aggregate load for the particular WAN priority queue is calculated via one or more signaling exchanges with the one or more small cell radios within the small cell network portion of the WAN instance, the aggregate load comprising an instantaneous aggregate load; and wherein the aggregate available bandwidth for the particular WAN priority queue is calculated via one or more signaling exchanges with a location bandwidth manager within the enterprise network portion of the WAN instance, the aggregate available bandwidth comprising an instantaneous aggregate available bandwidth.

10. The one or more non-transitory tangible media of claim 9, wherein it is determined that the particular WAN priority queue has available bandwidth for the session after determining the instantaneous aggregate available bandwidth for the WAN priority queue is greater than or equal to the bandwidth requirement for the session.

11. The one or more non-transitory tangible media of claim 9, wherein calculating the instantaneous aggregate load for the particular WAN priority queue includes calculating a sum of bandwidth previously allocated for one or more other sessions previously established or for one or more other sessions seeking being established for the particular WAN priority queue.

12. The one or more non-transitory tangible media of claim 9, wherein calculating the instantaneous aggregate available bandwidth includes subtracting the instantaneous aggregate load for the particular WAN priority queue from a total bandwidth reserved for the particular WAN priority queue for the WAN instance.

13. The one or more non-transitory tangible media of claim 8, wherein the session comprises a first session, wherein after determining bandwidth for the particular WAN priority queue is not available for a second session, the operations further comprise one of:

denying the second session from being established; and holding a setup request corresponding to the second session for a period of time before repeating the determining whether bandwidth for the particular WAN priority queue is available for the second session.

14. The one or more non-transitory tangible media of claim 8, wherein the session comprises a first session, wherein after determining bandwidth for the particular WAN priority queue is not available for a second session, the operations further comprise at least one of:

managing Quality of Service (QoS) by the central small cell function for at least one of: the second session for which a second setup request was intercepted; one or more other sessions previously established for the small cell network portion; and one or more other sessions for which another setup request has been intercepted for the small cell network portion;

communicating a request to the service provider network to allocate more bandwidth for the WAN instance; and communicating a request to a location bandwidth manager within the enterprise network portion to allocate more bandwidth for the small cell network portion.

15. A system for dynamic bandwidth allocation over a wide area network (WAN) instance, the system comprising:

at least one memory element for storing data; and at least one computer processor that executes instructions associated with the data, wherein the at least one computer processor and the at least one memory element cooperate such that the system is configured for:

during a transmission of a setup request for a session via a small cell network portion associated with the WAN instance, intercepting the setup request at an intercepting element of a plurality of intercepting elements of the small cell network portion, wherein the intercepting element is based on a request type of the setup request and is selected from a small cell radio element and a central small cell function element, wherein the WAN instance comprises the small cell network portion including one or more small cell radios and a central small cell function and an enterprise network portion including one or more enterprise communication devices, wherein the small cell network portion and the enterprise network portion of the WAN instance are interconnected with each other and to a service provider network;

classifying the session to a particular WAN priority queue of a plurality of WAN priority queues configured to support different types of traffic that traverse the WAN instance, wherein each of the plurality of WAN priority queues is allocated a respective portion of a total bandwidth of the WAN instance;

determining whether the particular WAN priority queue has available bandwidth for the session, based on a session type of the session and an aggregate available bandwidth for the particular WAN priority queue;

upon determining that the particular WAN priority queue has no available bandwidth for the session, performing a bandwidth remediation operation that includes re-routing the session to a non-priority queue; and upon determining that the non-priority queue has available bandwidth for the session, permitting the session to be established.

16. The system of claim 15, wherein the system is further configured for:

determining a bandwidth requirement for the session based on a session type associated with the session; and determining the aggregate available bandwidth for the particular WAN priority queue, based on an aggregate load for the particular WAN priority queue;

wherein the aggregate load for the particular WAN priority queue is calculated via one or more signaling exchanges with the one or more small cell radios within the small cell network portion of the WAN instance, the aggregate load comprising an instantaneous aggregate load; and wherein the aggregate available bandwidth for the particular WAN priority queue is calculated via one or more signaling exchanges with a location bandwidth manager within the enterprise network portion of the WAN instance, the aggregate available bandwidth comprising an instantaneous aggregate available bandwidth.

17. The computer-implemented method of claim 1, further comprising determining the aggregate available bandwidth for the particular WAN priority queue, based on an aggregate load for the particular WAN priority queue, wherein the aggregate load comprises an instantaneous aggregate load, wherein the aggregate available bandwidth comprises an instantaneous aggregate available bandwidth, wherein the plurality of intercepting elements includes the small cell radio element and the central small cell function element.

18. The computer-implemented method of claim 17, wherein the request type comprises, in respective instances, a mobile originating setup request, a mobile terminating setup request, a Session Initiation Protocol (SIP) invite, a Radio Resource Control (RRC) connection setup message, and a 3GPP Evolved Universal Mobile Telecommunications System (UMTS) Terrestrial radio access network (E-UTRAN) Radio Access Bearer (E-RAB) setup request;

wherein the setup request is intercepted at the small cell radio element when the request type of the setup request is the mobile originating setup request;

wherein the setup request is intercepted at the central small cell function element when the request type of the setup request is the SIP invite;

wherein the setup request is intercepted at the central small cell function element when the request type of the setup request is the mobile terminating setup request.

19. The computer-implemented method of claim 18, wherein the aggregate load comprises an instantaneous aggregate load, wherein the aggregate available bandwidth comprises an instantaneous aggregate available bandwidth, wherein further comprising:

determining a bandwidth requirement for the session based on the session type associated with the session;

wherein the instantaneous aggregate load for the particular WAN priority queue is calculated via one or more signaling exchanges with the one or more small cell radios within the small cell network portion of the WAN instance; and wherein the instantaneous aggregate available bandwidth for the particular WAN priority queue is calculated via one or more signaling exchanges with a location bandwidth manager within the enterprise network portion of the WAN instance.

20. The computer-implemented method of claim 19, wherein it is determined that the particular WAN priority queue has available bandwidth for the session after determining the instantaneous aggregate available bandwidth for the WAN priority queue is greater than or equal to the bandwidth requirement for the session;

wherein calculating the instantaneous aggregate load for the particular WAN priority queue includes, in respective instances:

(i) calculating a sum of bandwidth previously allocated for one or more other sessions previously established or for one or more other sessions seeking being established for the particular WAN priority queue; and (ii) subtracting the instantaneous aggregate load for the particular WAN priority queue from a total bandwidth reserved for the particular WAN priority queue for the WAN instance.

21. The computer-implemented method of claim 20, wherein the non-priority queue comprises a Best Effort queue, wherein the bandwidth remediation operation comprises a first bandwidth remediation operation, wherein the session comprises a first session, wherein after determining bandwidth for the particular WAN priority queue is not available for a second session, the computer-implemented method further comprises performing a second bandwidth remediation operation in lieu of allocating bandwidth for the particular WAN priority queue, the second bandwidth remediation operation comprising, in respective instances:

(i) denying the second session from being established;

(ii) re-routing the second session to another WAN instance after determining a plurality of WAN instances are configured for a communication network and another WAN instance has available bandwidth; and (iii) holding a setup request corresponding to the second session for a period of time before repeating the determining whether bandwidth for the particular WAN priority queue is available for the second session;

wherein the intercepting element is configured to, upon determining that the particular WAN priority queue has available bandwidth for the second session, allocate bandwidth for the particular WAN priority queue and permit the session to be established.

22. The computer-implemented method of claim 21, wherein after determining bandwidth for the particular WAN priority queue is not available for a second session, the computer-implemented method further comprises:
- managing Quality of Service (QoS) by the central small cell function for at least one of: the second session for which a second setup request was intercepted; one or more other sessions previously established for the small cell network portion; and one or more other sessions for which another setup request has been intercepted for the small cell network portion;
- communicating a request to the service provider network to allocate more bandwidth for the WAN instance; and
- communicating a request to a location bandwidth manager within the enterprise network portion to allocate more bandwidth for the small cell network portion;
- wherein managing QoS includes:
- adjusting a particular QoS level to prioritize circuit switched (CS) traffic over packet switched (PS) data traffic;
- adjusting a particular QoS level to prioritize Voice over Internet Protocol (VoIP) packet switched (PS) traffic over PS data traffic; and
- adjusting a particular QoS level for one or more radio access bearers to adjust priority between two or more sessions within the small cell network portion.

* * * * *